(12) United States Patent
Heffley et al.

(10) Patent No.: US 8,595,031 B1
(45) Date of Patent: Nov. 26, 2013

(54) METHOD AND APPARATUS FOR PROVIDING ACCESS TO HEALTHCARE FUNDS

(75) Inventors: Michael P. Heffley, Amherst, NY (US); Michael J. Colson, East Amherst, NY (US); Scott Strozyk, Clarence Center, NY (US); Robert M. States, East Amherst, NY (US)

(73) Assignee: Manning & Napier Information Services, LLC, Amherst, NY (US)

( * ) Notice: Subject to any disclaimer, the term of this patent is extended or adjusted under 35 U.S.C. 154(b) by 2305 days.

(21) Appl. No.: 10/605,900

(22) Filed: Nov. 5, 2003

Related U.S. Application Data

(63) Continuation-in-part of application No. 10/319,297, filed on Dec. 13, 2002.

(51) Int. Cl.
*G06Q 40/00* (2012.01)

(52) U.S. Cl.
USPC .......................................................... 705/4

(58) Field of Classification Search
USPC ...................................................... 705/2–4
See application file for complete search history.

(56) References Cited

U.S. PATENT DOCUMENTS

| | | | |
|---|---|---|---|
| 5,550,734 A | 8/1996 | Tarter et al. | |
| 5,704,044 A | 12/1997 | Tarter et al. | |
| 5,839,118 A | 11/1998 | Ryan et al. | |
| 6,010,069 A * | 1/2000 | Debois | 235/380 |
| 6,012,035 A * | 1/2000 | Freeman et al. | 705/2 |
| 6,208,973 B1 * | 3/2001 | Boyer et al. | 705/2 |
| 2002/0010544 A1 * | 1/2002 | Rudow et al. | 705/2 |
| 2002/0010594 A1 * | 1/2002 | Levine | 705/2 |
| 2002/0026328 A1 * | 2/2002 | Westerkamp et al. | 705/2 |
| 2002/0062279 A1 * | 5/2002 | Behrenbrinker et al. | 705/39 |
| 2002/0128863 A1 * | 9/2002 | Richmond | 705/2 |
| 2002/0147678 A1 | 10/2002 | Drunsic | |
| 2002/0198831 A1 * | 12/2002 | Patricelli et al. | 705/40 |
| 2003/0061153 A1 | 3/2003 | Birdsong et al. | |
| 2003/0101136 A1 * | 5/2003 | Wheeler et al. | 705/42 |

OTHER PUBLICATIONS

Cohn, Michael. Sculpting the software to the business. Accounting Technology. Boston: Sep. 1994. vol. 10, Iss. 8; p. 12, 12 pgs.*
www.evolutionbenefits.com, Nov. 11, 2002.
www.medibank.com, Nov. 11, 2002.
www.zadall.com, Mar. 19, 2003.
Revenue Ruling 2003-43, Internal Revenue Bulletin 2003-21, May 27, 2003, pp. 935-938.

* cited by examiner

*Primary Examiner* — Sheetal R Rangrej
(74) *Attorney, Agent, or Firm* — Simpson & Simpson, PLLC

(57) ABSTRACT

A method and apparatus for coordinating payment of healthcare expenses is disclosed. The method comprises determining a co-payment amount based on a customer's insurance coverage, determining the availability of funds from a plurality of the consumer's prioritized accounts, and deducting at least a portion of the co-payment from the highest priority account having available funds.

14 Claims, 31 Drawing Sheets

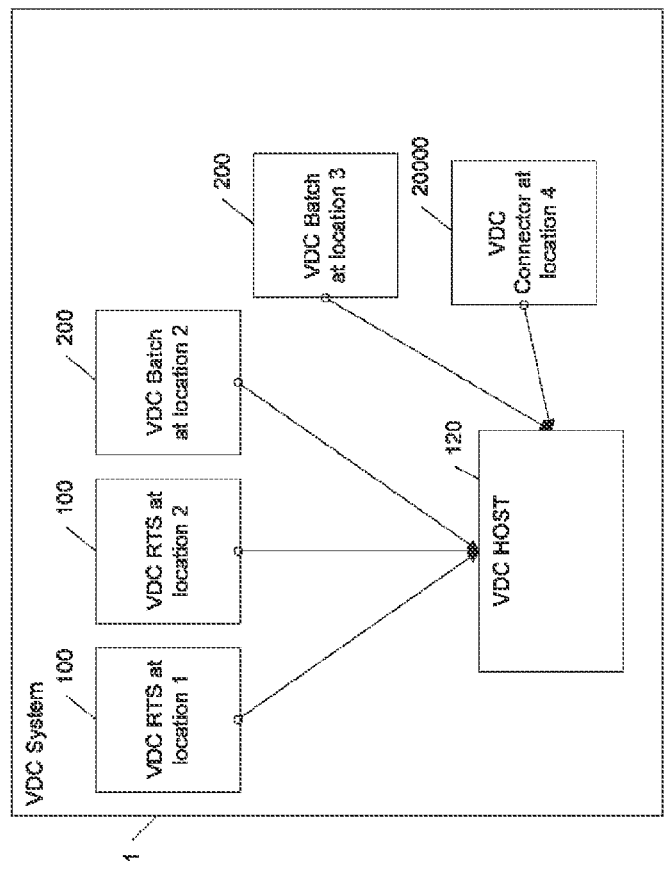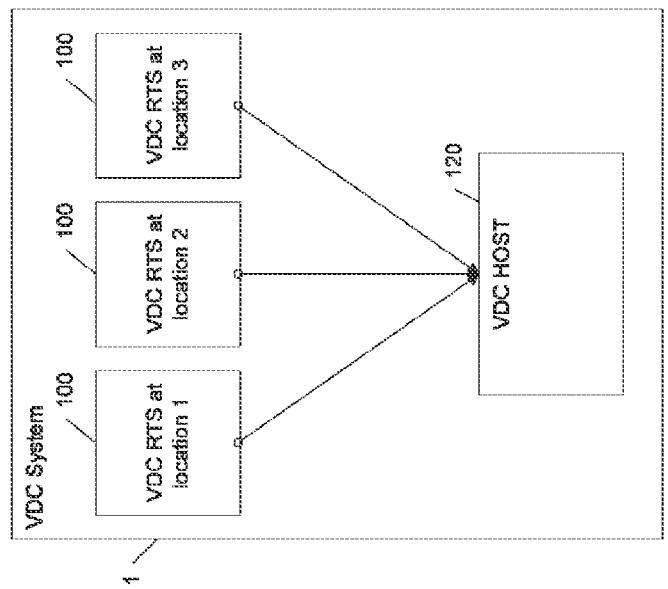
Figure 27

METHOD AND APPARATUS FOR PROVIDING ACCESS TO HEALTHCARE FUNDS

CROSS-REFERENCE TO RELATED APPLICATIONS

This application is a continuation-in-part of U.S. patent application Ser. No. 10/319,297, filed Dec. 13, 2002, which is incorporated by reference herein.

FIELD OF THE INVENTION

This invention relates to a method and apparatus for payment for healthcare goods and services. More specifically it relates to a method and apparatus for providing funds and routing payments for healthcare expenses. Even more specifically, the present invention relates to a method and apparatus for providing funds from one or more accounts for healthcare expenses.

BACKGROUND OF THE INVENTION

The present method of paying for healthcare expenses partially covered by medical insurance is cumbersome. This is especially true for a consumer wishing to pay for eligible healthcare expenses using funds from a tax-advantaged account (TAA), such as a flex spending account or health reimbursement arrangement. The healthcare provider must submit a claim for the part of the expense paid for by insurance and charge the participant for the balance due (Participant balance-due amount), which usually consists of, but is not limited to, the sum of the co-payment amount, any deductible amount, any uncovered amount, coinsurance, etc. If the participant has a TAA with her employer and desires reimbursement, the participant must save the receipt and submit it to a plan administrator, a function that the employer typically out-sources to a third party administrator (TPA), to receive reimbursement, usually with a significant delay. This is a problem for the participant since she pays out-of pocket twice, the first time from her paycheck and the second time to the provider, before she can be reimbursed for the eligible medical expense. The TPA then must manually process the receipts and adjudicate the participant's claims according to the Internal Revenue Service (IRS) and employer plan rules. This is a costly and error prone process since TPA's usually administer plans from numerous employers and each employer can tailor its own plan with respect to eligible medical expenses. The TPA then sends reimbursements to the participant for eligible claims. This is considered the initial and usual system process for reimbursing participants from their TAAs for eligible medical expenses. Although attempts have been made to streamline the process, significant inefficiencies and unnecessary costs remain. The trend is for more money fronted in TAAs as the participant balance-due amount increases due to increases in co-pay and deductible amounts.

Initial System Problems

Problems associated with the initial process for reimbursing the participant for eligible expenses from TAAs include the following:

1. There is a cash (or credit) outlay by the participant that temporarily doubles payment in connection with FSAs, and requires a payment by the participant in the case of HRAs that should be unnecessary since the employer has already funded the account. As participant point of sale obligations such as co-pays and deductibles go up, this becomes a bigger problem for the participant.
2. If reimbursement is desired, the participant must save the receipt and submit it to a TPA to receive reimbursement, usually with a significant delay. This is extremely inconvenient for participants.
3. The TPAs must perform manual claim adjudication. Manual claim adjudication is costly. For example, there is a manual, multi-step process associated with tying the payment of the participant balance-due amount at the point of sale (such as co-pay) to a qualified medical expense under IRS and employer plan regulations.

Additionally, an increasing number of employers are using combinations of TAA plans for employees. Not only are employers permitted to offer multiple TAAs to employees, such as offering employees both an FSA and an HRA, but employers may create different restrictions related to otherwise allowable expenses under IRS rules for each. This practice has increased the manual processing requirements and created significant risks of error. Since the employer is ultimately liable on the plan, yet it is the TPA who is typically managing the plan, conflicts inevitably arise as these plans and plan combinations become more and more complicated.

In order to solve some of the initial system problems, a method of payment for healthcare expenses from TAAs with a debit card was introduced. The participant can pay for any participant balance-due amount at the point of sale with the debit card using traditional payment networks such as the MasterCard network. The payment transaction would verify against and debit the participant's TAA for the amount of the transaction. The debit card provider would then pay the healthcare provider directly for the amount of the transaction. The intent of the debit card is to eliminate the participant double-pay (or unnecessary pay in the case of payments from HRAs) penalty for eligible medical expenses paid from TAAs. Unfortunately, this system of payment does not solve all of the initial system problems and, moreover, introduces significantly greater problems. The participant still must save all her receipts for auditing purposes and verification that she purchased only qualified medical expenses according to the IRS and employer plan rules. Even though the debit card transaction was electronic, the TPA must still manually adjudicate every claim since the participant can purchase any product at the point of sale with the debit card, not just eligible medical expenses (the cashier has no way of knowing that the debit card relates to a TAA, nor would it have the means to enforce particular rules). What's worse is the fact that the TPA must manually adjudicate each debit card claim with less information than it had when manually adjudicating with receipts. For debit card transactions, the TPA can typically only see who the provider was and the transaction dollar amount. No information about the product or products purchased is available to the TPA at this point. The debit card processors usually have constraints so that purchases can only be made through qualified medical providers such as medical equipment providers and pharmacies; however, these institutions sell many products, not just products that are eligible medical expenses under IRS and employer plan rules. It is up to the TPA to decide which transactions look suspicious and request the documentation from the participant for these transactions (hence the need for the participant to maintain receipts). There are also usually significant processes in place to recover funds from participants who have made debit card purchases for impermissible medical expenses or who can't provide the requested documentation to prove that they made an allowable medical purchase. These range from disabling the debit card to garnishing the participant's wages. This is all because the debit card does not prevent the purchase of unqualified medical expenses up front.

First Effort to Overcome the Problem—Debit Card

The debit card solves only one of the problems with the initial system. It partially solves two other problems. It actually creates several additional problems.

The problem the debit card solves is related to the "double payment." With the debit card, payment for goods and services comes directly from the TAA, therefore the double payment (and unnecessary payment with respect to HRAs) problem is eliminated.

The two problems the debit card only partially solves are:
1. While the debit card eliminates the need for a participant to submit every receipt for reimbursement from the TAA, the participant is required to maintain receipts for proof of authorized purchase in the event the adjudicator requests supporting documentation, such as in connection with an audit.
2. Since the debit card eliminates the need for participants to submit every receipt, it also reduces the amount of TPA time necessary for the processing of receipts. While this reduces costs (a bit), the TPA must still manually adjudicate claims. There is still a multi-step, manual process (if the participant balance-due amount looks "suspicious," the TPA must request the appropriate documentation from the participant, receive the documentation, and review the documentation to verify the subject claim) to tie the participant balance-due amount to a qualified medical expense. Now, though, the TPA has less information to assess legitimacy of purchases. This actually creates a much greater risk of fraud or other abuse related to use of TAA funds for unauthorized purchases. The risk is increased because multiple and unrelated purchases can be made in one transaction (bundled with a qualified medical expense) without any practical ability to police purchases at the point of sale. While debit card providers have attempted to mitigate this problem by allowing transactions to occur only at merchants with specified merchant category codes. This and other techniques are only band-aiding the underlying flaws in the debit card system.

The debit card system actually creates additional problems:
1. Previously, a participant needed to only present an insurance card and identification to the provider. The debit card system requires a participant to also carry and present a TAA debit card.
2. The employer must pay an additional fee to the TPA for each debit card participant, typically in the amount of $2 Per Employee per Month (PEPM).
3. Since the debit card system effectively replaces cash transactions, Providers must now pay a bank charge for every authorized TAA transaction (fee associated with the debit card usage).
4. Since the debit card has eliminated the need for participants to submit each receipt for reimbursement, adjudicators have less information to assess legitimacy of purchases, and each transaction is therefore at a higher risk of fraud.
5. The debit card system cannot properly adjudicate claims in the case where an employer has restricted the IRS expenses which would otherwise be allowable in the FSA or HRA plan.
6. The debit card system does not facilitate payment from multiple accounts. And it does not facilitate rule-based payments from multiple accounts.

Other Efforts to Overcome the Problem

There have been attempts to mitigate problems associated with the initial system or the debit card system, or both. They are described briefly below.

The websites www.evolutionbenefits.com and www.medibank.com both disclose FSA cards. These cards allow a participant to spend money directly from a FSA, rather than pay out-of-pocket and seek reimbursement later. However, www-.medibank.com still requires the participant to save the receipts to verify eligibility of the expenses. Further, the account cards only allow spending from the participant's FSA. If the participant runs out of money in the FSA, the participant will be forced to pay out-of-pocket, or provide other payment means.

United States Patent Application Publication No. US 2002/0147678 discloses a debit card system for accessing funds in a participant's FSA. The debit-card does not post directly to the participant's FSA, but rather to a program sponsor's shadow account (an unfunded account used for record keeping purposes during claim adjudication). The funds to pay the provider for the transaction are deducted from the program sponsor's group account (funded by the sponsor) at the same time as the posting to the shadow account occurs. The transactions (not the funds) remain in the shadow account until such time as they can be adjudicated, at which time they are released from the shadow account and posted to the individual participant's FSA. Rejected transactions are moved from the shadow account to the program sponsor's suspense account. The program sponsor can use the information in the suspense account to reclaim the funds from the participant by various means, such as debiting the participant's next paycheck. This provision in and of itself underscores the deficiency with the proposed approach. A combination of manual and automatic adjudication methods are proposed for handling the FSA reimbursements.

United States Patent Application Publication No. US 2002/0198831 discloses a means for processing FSA transactions using a plurality of pharmacies, a stored value card service provider (SVCSP), one or more pharmacy benefits managers (PBMs), individuals having FSAs, and a stored value card (SVC) for debiting a participant's FSA. At the point of service (POS), the goods or service provider, such as a pharmacy, electronically transmits a claim to the respective payor, such as a PBM, which includes the participant information. The payor adjudicates the claim and responds with the participant balance-due amount. At the same time, the payor transmits some of the transaction data, such as the participant identifier, date and time of the transaction, and participant balance-due amount, to the SVCSP. The participant then uses the SVC at the POS to pay for the participant balance-due amount from the participant's FSA. The SVCSP handles the adjudication of this SVC transaction by searching its' database for a matching transaction received from the payor. If a match is found and there are sufficient funds in the participant's FSA, the transaction is automatically adjudicated. If no match is found, the adjudication request is rejected. The intent of this invention is to prevent the use of FSA dollars for impermissible IRS expenses. This requires that the payor successfully adjudicates only claims for IRS allowed expenses. This requirement is stated as an advantage of the subject invention. The fact is payors, such as PBMs, are focused on participant eligibility, what is and what is not covered under a specific participant's health plan, and what participant balance-due amount is due for a claim. Payors/PBMs are not focused on or concerned with whether or not a claim is for an IRS allowable expense and an employer allowable expense in connection with a TAA, and this validation is not part of their normal adjudication process. There is a shared responsibility between the employer, SVCSP, and participant to ensure that such reimbursements are properly substantiated according to IRS and employer plan rules. More specifically, there may be items that are covered by medical plans and therefore successfully adjudicated by the payor, which are not expenses allowed by both the IRS and employer rules in connection with the TAA. This point conflicts with the invention's proposal that SVC transactions that match a payor adjudicated claim can be automatically adjudicated by the SVCSP as IRS and employer plan allowed TAA expenses. Furthermore, this invention moves the day-to-day task of ensuring IRS claims substantiation from the employer to the payor, a party that is not substantially involved with this responsibility in whole or in part today, thus opening the door for more complicated compliance procedures and/or potential legal ramifications. This point is underscored with the invention's statement of the advantage that the payor (and not the SVCSP database) may retain sufficient information to enable the SVCSP to later prove that the specific drug or item that was the subject of the transaction was properly reimbursable. Simply put, the fact that an item has passed the payor's adjudication does not mean it is properly reimbursable under IRS and employer plan rules.

United States Patent Application Publication No. US 2003/0061153 discloses a method of using a debit card for an employee benefits program. The debit card transactions are processed as "e-claims" and still require the participant to send in receipts and the processor to manually adjudicate these claims. Significant mechanisms are described to notify participants that receipts are due for substantiating a claim and to disable the debit card in situations in which the claims are not verified within a specified period of time or if the claims are for unqualified IRS expenses. As well, no mechanisms are described for preventing the purchase of impermissible IRS expense items upfront.

In summary, none of these approaches a complete solution to the problems associated with the initial system; participant inconvenience and costly manual adjudication of TAA related claims. Additionally, the foregoing attempts to solve the problems with the initial system have created new problems; a greater potential for unauthorized use of TAA dollars, increased employer and provider costs, and new participant inconveniences. In fact, all debit card approaches substantially require mechanisms to recover tax-advantaged dollars used for purchases that may later be deemed to be impermissible. The increasingly sophisticated attempts to automate some of the claim substantiation with debit cards, such as matching purchase amounts with participant health plan co-pay amounts to automatically adjudicate debit card transactions allow room for abuse by savvy participants who can use the debit card to cover non-qualified product/service purchases that match these same amounts. These efforts will result in increasing exposure over time as the complexity of health plans are increasing with the combination of larger and varied co-pay, deductible, and coinsurance amounts. Moreover, these efforts do not eliminate the costly manual adjudication of claims for reimbursement.

IRS Guidance

The IRS, in the advanced copy of Revenue Ruling 2003-43, which was scheduled to appear in the Internal Revenue Bulletin 2003-21, dated May 27, 2003, has described the rules regarding the use of debit cards and credit cards to reimburse participants in self insured medical reimbursement plans. It is clear from the guidance that the IRS requires all claims to be substantiated, no matter how small the dollar amount. The desire to fix the problems of manual claims substantiation and consumer double pay are so great that the IRS has provided for some scenarios in which claims can be automatically substantiated, without a receipt, with a debit/credit card transaction. First, claims in which the dollar amount at a health care provider equals the dollar amount of the co-payment for that service under the major medical plan of the specific employee-cardholder can be automatically substantiated. Second, recurring expenses that have been previously approved for the same amount, from the same provider, and during the same time period can be automatically substantiated. Third, if the merchant, service provider, or other independent third party, at the time and point of sale, can provide information to the employer that the charge is for a medical expense, the charge can be automatically substantiated. All other scenarios are considered conditional pending confirmation of the medical expense. In our estimation it is still possible that invalid medical expenses can be reimbursed via the first two scenarios described above. It is also possible under the third scenario, with debit card use, that invalid medical expenses can be reimbursed if the employer has restricted the allowable expenses in their tax-advantaged plan. While the IRS is attempting to reduce costs associated with manual claim adjudication, the implementation of these scenarios will be costly.

Problems that Still Remain

1. The participant must carry a debit card or temporarily double pay (or unnecessarily pay in connection with payments out of HRAs) participant balance-due amounts.
2. The participant must use the TAA debit card for TAA approved expenses, and a separate means of payment for other combined purchases, therefore, two or more card transactions must occur at the point of sale.
3. The participant must save all receipts and send in for reimbursement or in the case of debit card transactions, keep receipts for potential TPA audit.
4. If an employer selects the debit card approach, the employer must pay the TPA and additional fee for each debit card participant.
5. The TPA must manually adjudicate each claim based on receipts received, or manually adjudicate each "debit card" claim without receipts (thereby creating a potential for fraudulent use of TAA dollars for non authorized purchases).
6. With either the initial system transactions or the debit card transactions, there is a multi-step, manual process to tie the participant balance-due payment amount to a qualified medical expense under IRS and employer rules for TAAs.
7. There is no fully automated way to adjudicate claims for employer-specific FSA or HRA plans that restrict the allowable IRS expenses. Without a fully automated (rule based) adjudication system for TPAs, as the complexities of plans increase, employers will be subject to greater exposure to liability for processes that are managed fully by a TPA.
8. There is no easy way to enable a participant to pay the participant balance-due amount from multiple prioritized accounts (both TAA and non-TAA accounts).
9. There is no easy way to enable a participant to pay the participant balance-due amount from another participants accounts, such as the account of a spouse.

What is needed is a system that solves all of the problems presented by the initial system, without creating new problems.

What is needed is:
1. A system that eliminates the out of pocket expense (double payment or otherwise unnecessary payment) by the participant of the participant balance-due amount.
2. A system that eliminates the inconvenience of receipt maintenance or submission.
3. A system that eliminates the need for two transactions at the point of sale in the event the participant is purchasing non-authorized items in addition to the authorized items.
4. A system eliminates the out of pocket expense (double payment or otherwise unnecessary payment) by the participant and the inconvenience of managing receipts without adding a debit card expense to the employer, and allowing the funds to be used only for plan eligible expenses as defined by the IRS and employer plan rules.
5. As system that eliminates all manual processing in connection with claim adjudication of TAA reimbursements.
6. A system that meets all of the IRS claims substantiation requirements electronically, without the need for manual record keeping and processing to ensure that all claims are related to legitimate plan eligible expenses that have not been previously reimbursed and are not reimbursable by any other means.
7. A system that enables the employer to define and implement rules associated with reimbursements from a participants TAA for payment of participant balance-due amounts, and removes all adjudication obligations and responsibilities from the plan administrator.
8. As system that enables a participant to pay participant balance-due amounts from multiple accounts including accounts of another participant, such as an account of a spouse.

SUMMARY OF THE INVENTION

The present invention broadly comprises a method and apparatus for facilitating payment of healthcare or other expenses. The method comprises determining a participant balance-due amount based on a participant's insurance coverage, determining the availability of funds from a one or more of the participant's prioritized accounts, and deducting at least a portion of the participant balance-due amount from the highest priority account having available funds.

A general object of the present invention is to provide a method and apparatus to automatically, electronically facilitate the payment of the participant balance-due amount (co-pay, deductible, coinsurance, uncovered amounts) for healthcare or other expenses from a participant's account(s) so as to eliminate all manual adjudication of claims, and participant inconveniences such as the need to maintain and submit receipts and the double payment (or unnecessary payment).

A system that eliminates the out of pocket expense (double payment or otherwise unnecessary payment) by the participant of the participant balance-due amount.

A system that eliminates the inconvenience of receipt maintenance or submission.

A system that eliminates the need for two transactions at the point of sale in the event the participant is purchasing non-authorized items in addition to the authorized items.

A system eliminates the out of pocket expense (double payment or otherwise unnecessary payment) by the participant and the inconvenience of managing receipts without adding a debit card expense to the employer, and allowing the funds to be used only for plan eligible expenses as defined by the IRS and employer plan rules.

As system that eliminates all manual processing in connection with claim adjudication of TAA reimbursements.

A system that meets all of the IRS claims substantiation requirements electronically, without the need for manual record keeping and processing to ensure that all claims are related to legitimate plan eligible expenses that have not been previously reimbursed and are not reimbursable by any other means.

A system that enables the employer to define and implement rules associated with reimbursements from a participants TAA for payment of participant balance-due amounts, and removes all adjudication obligations and responsibilities from the plan administrator.

As system that enables a participant to pay participant balance-due amounts from multiple accounts including accounts of another participant, such as an account of a spouse.

Another object of the present invention is to provide a method and apparatus to facilitate automatic payment of the participant balance-due amount from the highest priority client account having available funds, and from multiple participant accounts, and from accounts of multiple participants.

Another object of the present invention is to provide a method and apparatus facilitate payment of a participant balance-due amount for healthcare expense while automatically meeting all of the IRS claims substantiation requirements.

Another object of the present invention is to provide a method and apparatus to facilitate payment of the participant balance-due amount from TAAs such as FSAs and HRAs.

Yet another object of the present invention is to provide a method and apparatus to facilitate payment of part or all of the participant balance-due amount from accounts sponsored by third-parties for incentive programs, rewards programs, points programs, coupons, etc.

These and other objects, features and advantages of the present invention will become readily apparent to those having ordinary skill in the art upon a reading of the following detailed description of the invention in view of the drawings and claims.

Virtual Debit Card

The system of the present invention solves the all the problems in the initial system problem and provides benefits not available with existing solutions today.

1. With the VDC system, the participant is automatically reimbursed at the point-of-service with no double or other unnecessary payment penalty.
2. With the VDC system, the participant does not have to manage or submit receipts for audit or reimbursement purposes.
3. With the VDC system, the participant does not have a debit card to carry, and the employer does not debit card fees to pay (typically to the TPA).
4. With the VDC system, the manual claim adjudication process is eliminated; the VDC system provides real-time, automatic adjudication for TAAs. The multi-step, manual process to tie the participant balance-due amount payment with a qualified medical expense under IRS rules is now an automatic, single-step, single-transaction process.
5. The VDC system facilitates the prevention of impermissible purchases using TAA dollars.
6. The VDC system automatically meets the intent and spirit of the IRS Claims Substantiation Requirements, completely eliminating all manual claim adjudication processing.
7. Since the VDC system is flexible and rules-based, it can be readily modified to incorporate any other applicable rules or regulations of any other authority (i.e., the Department of Labor) that are deemed to be necessary for participant accounts may be provided for with the VDC system.

8. With the VDC system, payment of the participant balance-due amount can be made from multiple participant accounts (in a prioritized manner), and from accounts of multiple participants.

BRIEF DESCRIPTION OF THE DRAWINGS

The nature and mode of operation of the present invention will now be more fully described in the following detailed description of the invention taken with the accompanying drawing figures, in which:

FIG. 27 is a schematic diagram showing the many ways in which the VDC system can be deployed;

DETAILED DESCRIPTION OF THE PREFERRED EMBODIMENTS

It should be appreciated that, in the detailed description of the preferred embodiments of the invention that follows, like reference numbers on different drawing views are intended to identify identical structural elements of the invention in the respective views.

Payment for healthcare goods and services is currently being made in an inefficient manner, especially with respect to TAAs such as FSAs and HRAs. In the present invention, a FSA is an account containing pre-tax funds provided by an employee under Title 26 U.S.C. §105(b) for healthcare expenses. A HRA is an account containing funds provided by an employer for an employee's healthcare expenses.

Figure 1:
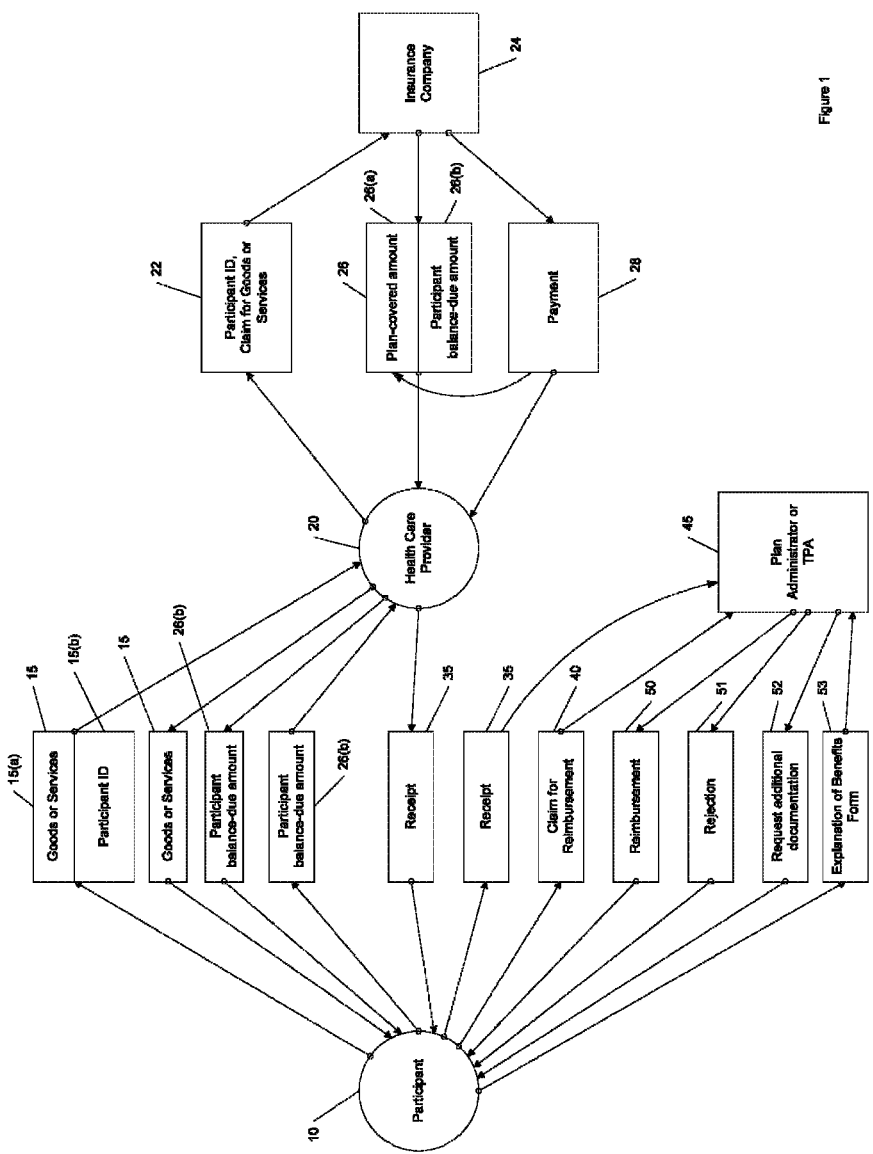
FIG. 1 is a schematic diagram summarizing the current system for providing reimbursement for paid participant balance-due amounts.

A schematic diagram summarizing the current system for providing reimbursement for paid participant balance-due amounts is shown in FIG. 1. Participant 10 requests a healthcare good or service from provider 20. Participant 10 communicates the good or service needed 15(a) and the participant's health insurance information 15(b) to provider 20 by a means such as showing provider 20 a prescription and an insurance card. Provider 20 then contacts the appropriate insurance company 24, via a real time, online software application such as Zadall to determine the eligibility of and/or to file a claim for the participant 10 for health insurance benefits. Provider 20 communicates a message 22 containing a description of the good or service requested 15(a) and participant information 15(b) to the insurance company 24 via a real time, online software application such as Zadall. Insurance company 24 sends a message 26 to provider 20 via a real time, online software application such as Zadall to communicate the plan-covered amount 26(a) under participant's plan and the participant balance-due amount 26(b) required from participant 10 for the requested good or service 15(a). The insurance company 24 sends payment 28 to the provider 20 for the plan-covered amount 26(a) at a later date and time. The provider supplies the good or service 15 to participant 10 and communicates to participant 10 the participant balance-due amount 26(b). Participant 10 tenders payment of participant balance-due amount 26(b) by check, cash, credit or debit card, or other form of payment. If participant 10 would like the participant balance-due amount 26(b) to come from funds in a TAA, such as a FSA or HRA, participant 10 must save the receipt 35 and submit it with a claim for reimbursement 40 to the plan administrator (PA) 45, which is typically a TPA. Upon receiving the claim for reimbursement 40 with the appropriate receipt 35, the PA 45 manually adjudicates the claim for reimbursement 40. If the PA 45 adjudicator determines that the expense is an eligible healthcare expense under the IRS and employer plan rules for use of participant's 10 TAA funds, it sends reimbursement 50 to participant 10. If the PA 45 adjudicator determines that the expense is not an eligible healthcare expense under the IRS and employer plan rules for use of participant's 10 TAA funds, it sends participant 10 a rejection 51. If the PA 45 adjudicator determines that the expense may not be an eligible healthcare expense under the IRS and employer plan rules for use of participant's 10 TAA funds, it sends participant 10 a rejection 51 and requires additional information from participant 10 before approving the claim for reimbursement 40. This becomes a very cumbersome and frustrating process for participant 10. For example, the participant 10 may send in a receipt 35 for a valid medical expense such as a prescription. If the receipt 35 does not have the appropriate prescription information listed, then the PA 45 may request additional documentation 52. The participant 10 would then have to submit additional documentation, such as an explanation of benefits form 53 that has more detailed prescription information on it in order to get reimbursed for the expense.

Figure 2:
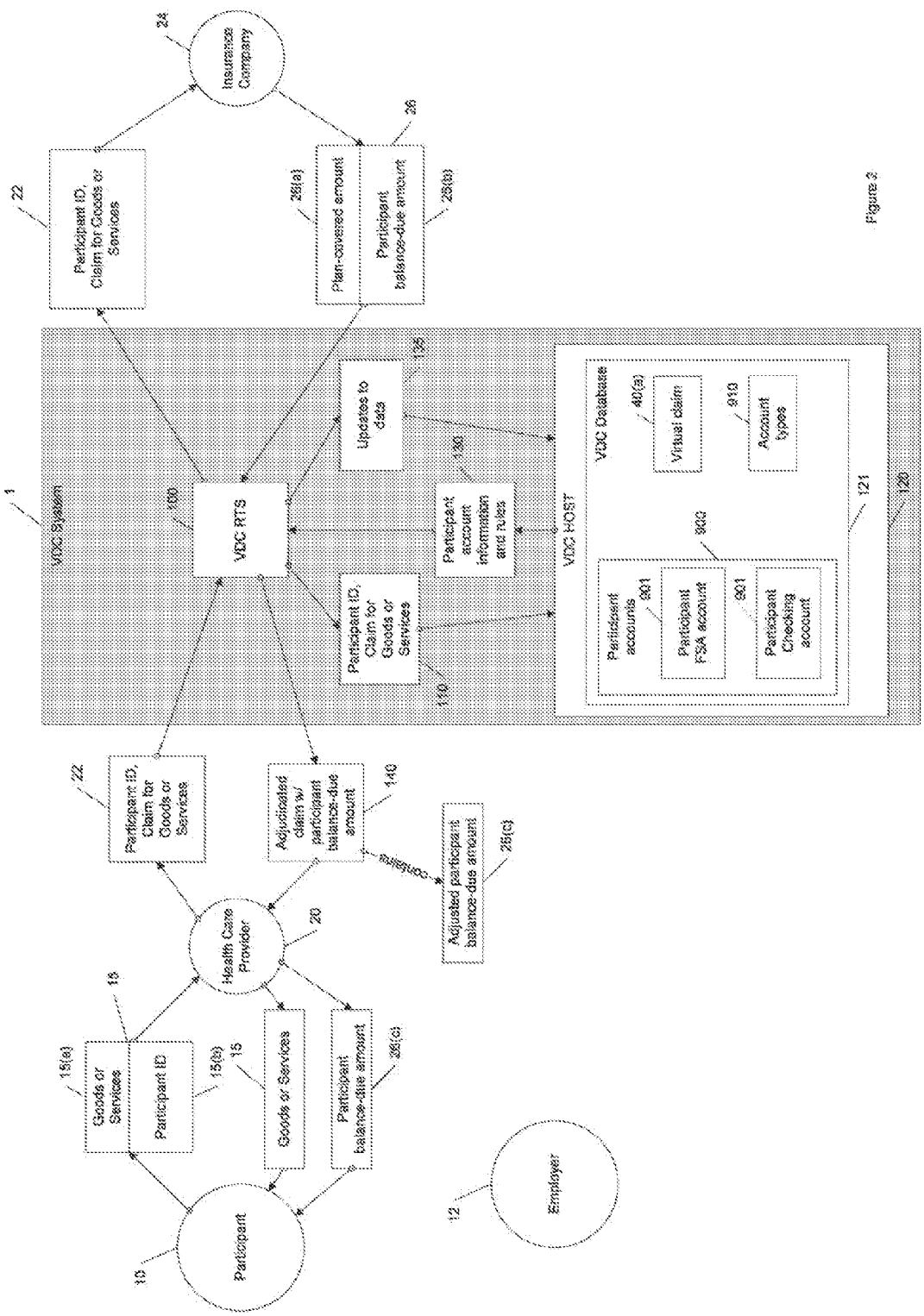
FIG. 2 is a work flow diagram of the present invention.

A work flow diagram of the present invention is shown in FIG. 2. Participant 10 communicates the good or service needed 15(a) and the participant's health insurance information 15(b) to provider 20, such as by showing provider 20 a prescription and a health insurance card. Provider 20 then contacts the appropriate insurance company 24 via a real time, online software application such as Zadall to determine the eligibility of and/or to file a claim for the participant 10 for health insurance benefits. Provider 20 communicates a message 22 containing a description of the good or service requested 15(a) and participant information 15(b) to the insurance company 24 via a real time, online software application such as Zadall, using a standard protocol such as TCP/IP. The Virtual Debit Card Real-Time System (VDC RTS) 100 receives the message 22 from the provider 20. The VDC RTS 100 makes a copy 110 of the message 22, and then forwards the message 22 to the insurance company 24 for claim adjudication, via a standard protocol such as TCP/IP. At the same time, VDC RTS 100 uses information from its' copy 110 to request participant account(s) information and rules 130 contained in the Virtual Debit Card Host System (VDC HOST) 120 loaded previously (and described in more detail below). Insurance company 24 sends a response message 26 to VDC RTS 100 using a standard communications protocol such as TCP/IP to communicate the plan-covered amount 26(a) and the participant balance-due amount 26(b) required from participant 10 for the requested good or service 15(a). VDC RTS 100 receives message 26. VDC RTS 100 also receives the previously requested participant account(s) information and rules 130 from the VDC HOST 120. VDC RTS 100 uses the participant account(s) information and rules 130 to adjudicate the participant's virtual claim for reimbursement 40(a) (a virtual claim for reimbursement is a claim automatically generated by the VDC System 1 on behalf of the participant 10 to automatically effect payment from a participant account(s) 901 for the participant balance-due amount 26(b)) and deter-mines if there are enough funds available in the participant's account set 900 to adjust (reduce or zero-out) the participant balance-due amount 26(b). A message 140 containing the adjusted participant balance-due amount 26(c) (which would be zero unless there are insufficient funds in the account set 900 to pay the full amount of participant balance-due amount 26(b)) is sent from the VDC RTS 100 to the provider 20. The VDC RTS 100 sends an update transaction 135 to the VDC HOST 120 to adjust the account set 900 in a manner consistent with the payment of the participant balance-due amount 26(b). The relevant contents of each message 140 and update transaction 135 where an adjustment to account set 900 occurs are stored in the VDC HOST database 121 as a virtual claim 40(a) for payment, billing, reporting, and other purposes. Account set 900 may include any kind of accounts where units are stored and can be used to fully or partially pay a participant balance-due amount 26(b). The most typical types of accounts 910 in account set 900 would be TAAs. But, account set 900 may also include (or include instead) checking accounts, savings accounts, credit or debit card accounts, or any other financial account known in the art. Units would typically represent currency. Any number of account(s) 901 within account set 900 may be designated by the participant 10 or the employer 12 to provide funds for healthcare expenses. The units to pay the participant balance-due amount 26(b) are deducted from the appropriate account(s) 901 within account set 900 based upon participant account(s) information and rules 130. The appropriate account(s) 901 are automatically determined on a case-by-case basis by participant account(s) information and rules 130 (see further descriptions of rules below). If the processing of the participant account(s) information and rules 130 does not result in sufficient funds to pay any of the participant balance-due amount 26(b), the message 140 that is sent from VDC RTS 100 to provider 20 will not contain an adjusted participant balance-due amount 26(c) but rather the original participant balance-due amount 26(b). In that case, the participant would be required to pay the full participant balance-due amount 26(b) by other means at the point of sale. If the processing of the participant account(s) information and rules 130 does not result in sufficient funds to pay all of the participant balance-due amount 26(*b*), the message 140 that is sent from VDC RTS 100 to provider 20 may contain an adjusted participant balance-due amount 26(*c*) that is more than zero. In that case, the participant would be required to pay the partial, adjusted participant balance-due amount 26(*c*) by other means at the point of sale.

Figure 3:
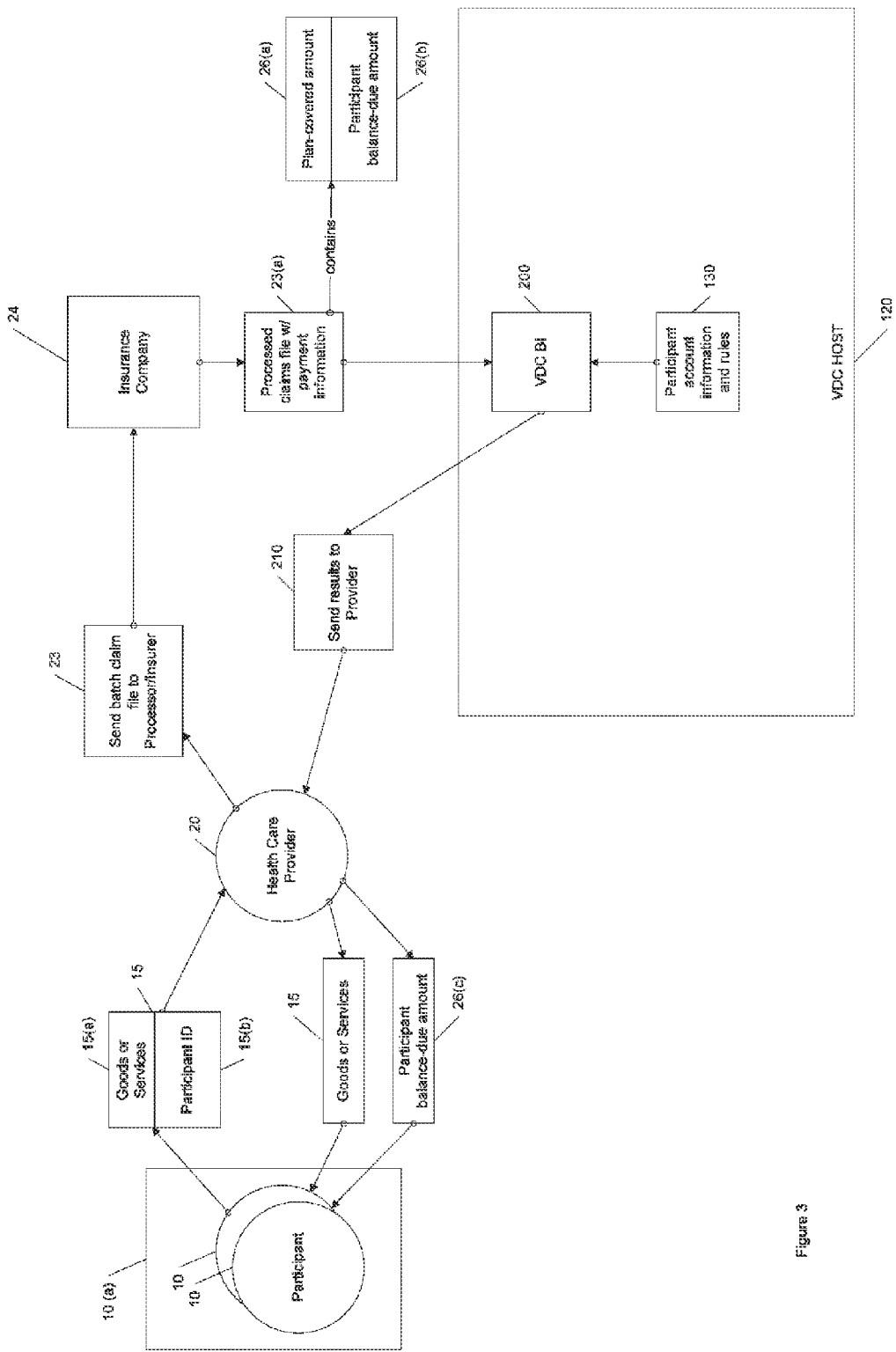
FIG. 3 is a work flow diagram showing the present invention providing payment for healthcare goods or services in batch mode, where the provider periodically communicates claim information to the insurance company for all claims that were made during the previous period by one or more participant(s)

FIG. 3 is a work flow diagram showing the present invention providing payment for healthcare goods or services in batch mode, where the provider 20 periodically communicates claim information to the insurance company 24 for all claims that were made during the previous period by one or more participant(s) 10(*a*). During a period, one or more participant(s) 10 communicate the goods or services needed 15(*a*) and the participant's health insurance information 15(*b*) to provider 20. Provider 20 then contacts the appropriate insurance company 24 to file a batch of claims 23 for health insurance benefits. The batch of claims 23 contains the description of the goods or services requested 15(*a*) by each participant 10 within the batch of participant(s) 10(*a*) and participant information 15(*b*) for each participant 10 within the batch of participants 10(*a*). The insurance company 24 processes the batch of claims 23, then sends a file 23(*a*) formatted as an industry standard 835 file (or other agreed upon format) containing the processed batch of claims 23 to the VDC HOST 120 via a standard protocol such as FTP. The Virtual Debit Card Batch Interface (VDC BI) program 200 processes the file 23(*a*) which contains participant balance-due amount 26(*b*) for each participant's claim for goods or services 15(*a*) using the associated participant account(s) information and rules 130 from the VDC HOST 120. The adjusted results file 210 formatted as an industry standard 835 file (or other agreed upon format) may be sent to the provider 20 via standard means such as FTP or EDI.

Figure 4:
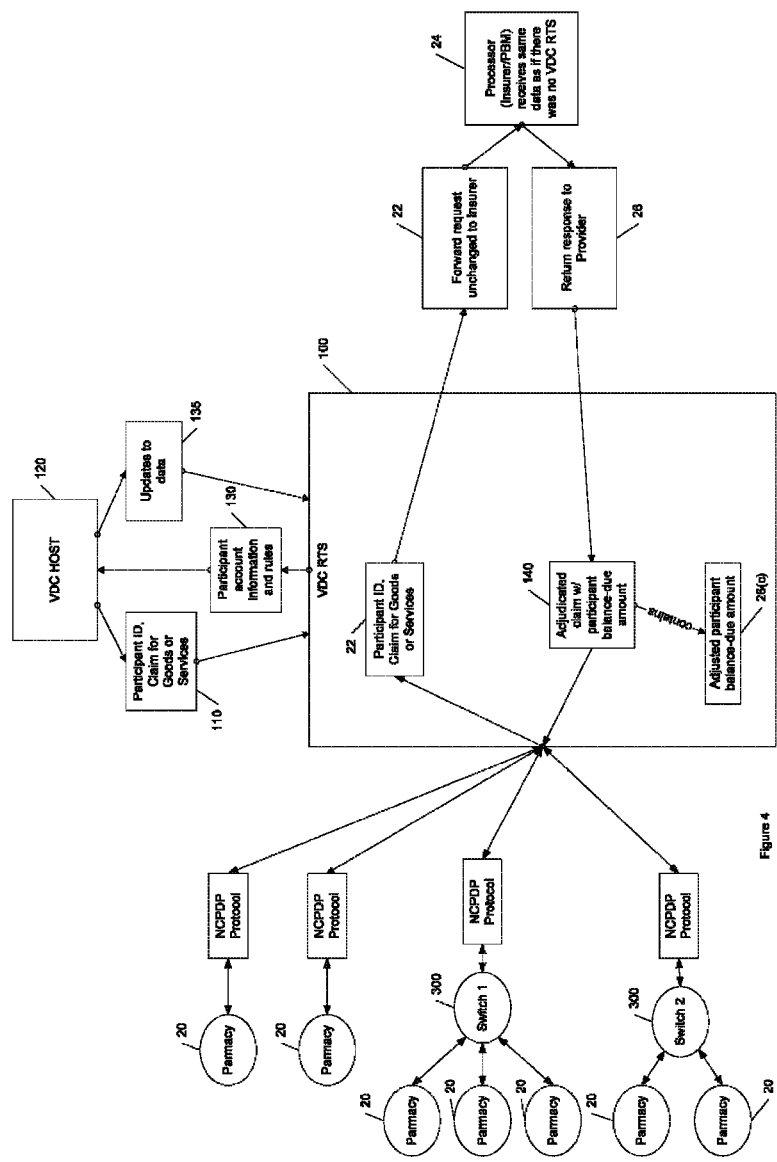
FIG. 4 is a work flow diagram showing the details of the real-time payment-processing component for the present invention.

FIG. 4 is a work flow diagram showing the details of the real-time payment-processing component for the present invention. The invention is designed to transparently interface with existing providers 20 and insurers 24 using standard protocols, such as the National Council for Prescription Drug Programs (NCPDP) protocol version 5.1, or non-standard protocols such as those built in-house or by outside vendors/ consultants. A message 22 is typically sent directly from provider 20 or from provider via through a switch 300 (an aggregator of providers 20), as an electronic message to the insurer 24. With the present invention, message 22 is sent from the provider 20 (either directly or via a switch 300) to VDC RTS 100 for processing just as described in FIG. 2 above. Message 22 is then forwarded on to insurer 24 for adjudication. From that point, the process shown in FIG. 4 is the same as the process shown and described in connection with FIG. 2 above. With this solution, VDC RTS 100 effectively takes the place of the provider 20 or switch 300 in sending message 22 to the insurer 24, and effectively takes the place of the insurer 24 in sending message 26 to provider 20 or switch 300. The result is minimal, if any, programming changes required to the provider 20, switch 300, or insurer 24 systems. The changes are primarily network configuration changes to route transactions through VDC RTS 100, which are technically simple.

Figure 5:
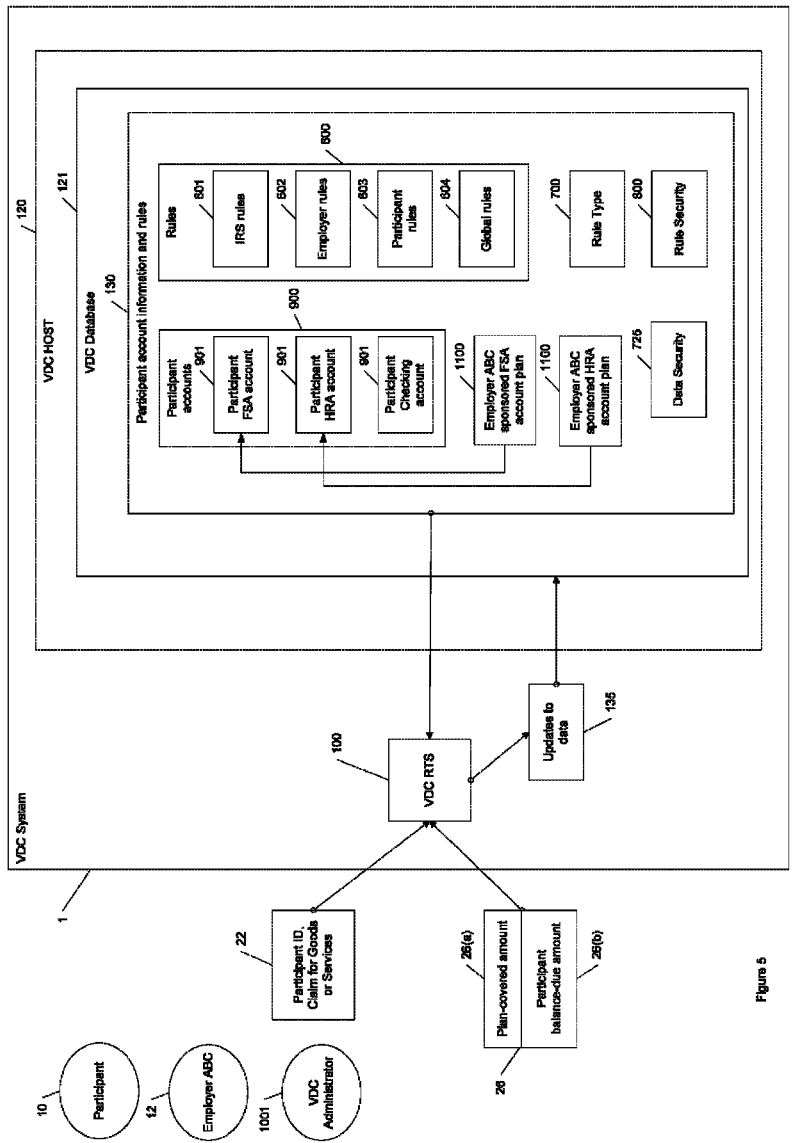
FIG. 5 is a work flow diagram showing the real-time, rules-based, auto-adjudication component of the present invention.

FIG. 5 is a work flow diagram showing the real-time, rules-based, auto-adjudication component of the present invention. The VDC RTS 100 component uses the participant account(s) information and rules 130 contained in the VDC HOST 120 to decide which account(s) 901 from account set 900 the participant balance-due amount 26(*b*) will be paid from. The decision is based upon the combination of rules 600, such as IRS rules 601, employer account plan rules 602, and participant rules 603 that are defined in the VDC database 121 for the participant's account set 900. The rules 600 are categorized by rule type 700, which indicates the nature and scope of each rule 600. The rules 600 are designed to be flexible, dynamic, and easily maintained in that they are not hard coded into the application and are instead simply stored as metadata in the VDC HOST database 121. The rules are governed by tight security 800 to prevent unauthorized modifications, such as by incorporating access controls. The security 800 is data-driven so it is flexible and easy to configure, and may evolve over time as other needs arise. For example, the security 800 can be configured in a way such that, global rules 604 can only be maintained by the VDC administrator 1001; employer account plan rules 602 can only be maintained by the employer 12; and participant rules 603 can only be maintained by the respective participant 10. The VDC System 1 can accommodate other rules 600 and rule types 700 in addition to those mentioned. Therefore, rules can evolve over time as needs and opportunities in the marketplace demand. During the VDC System 1 adjudication process, the rules 600 have access to all the VDC RTS 100 inputs, such as the original claim message 22 and the insurer response message 26, and the data available within the VDC HOST database 121 for the purpose of making decisions during the execution of such rules. The rule executions may effect changes via an update transaction 135 (additions, updates, and/or deletions) to any data stored in the VDC HOST database 121, such as information from a participant's account set 900. The allowed changes to data in the VDC HOST database 121 are governed by data security 725. The security 725 is data-driven so it is flexible and easy to configure, and may evolve over time as other needs arise. For example, employer 12 may have access to view and effect changes only for the accounts 901 in the VDC HOST database 121 belonging to the employer's sponsored account plan(s) 1100.

Figure 6:
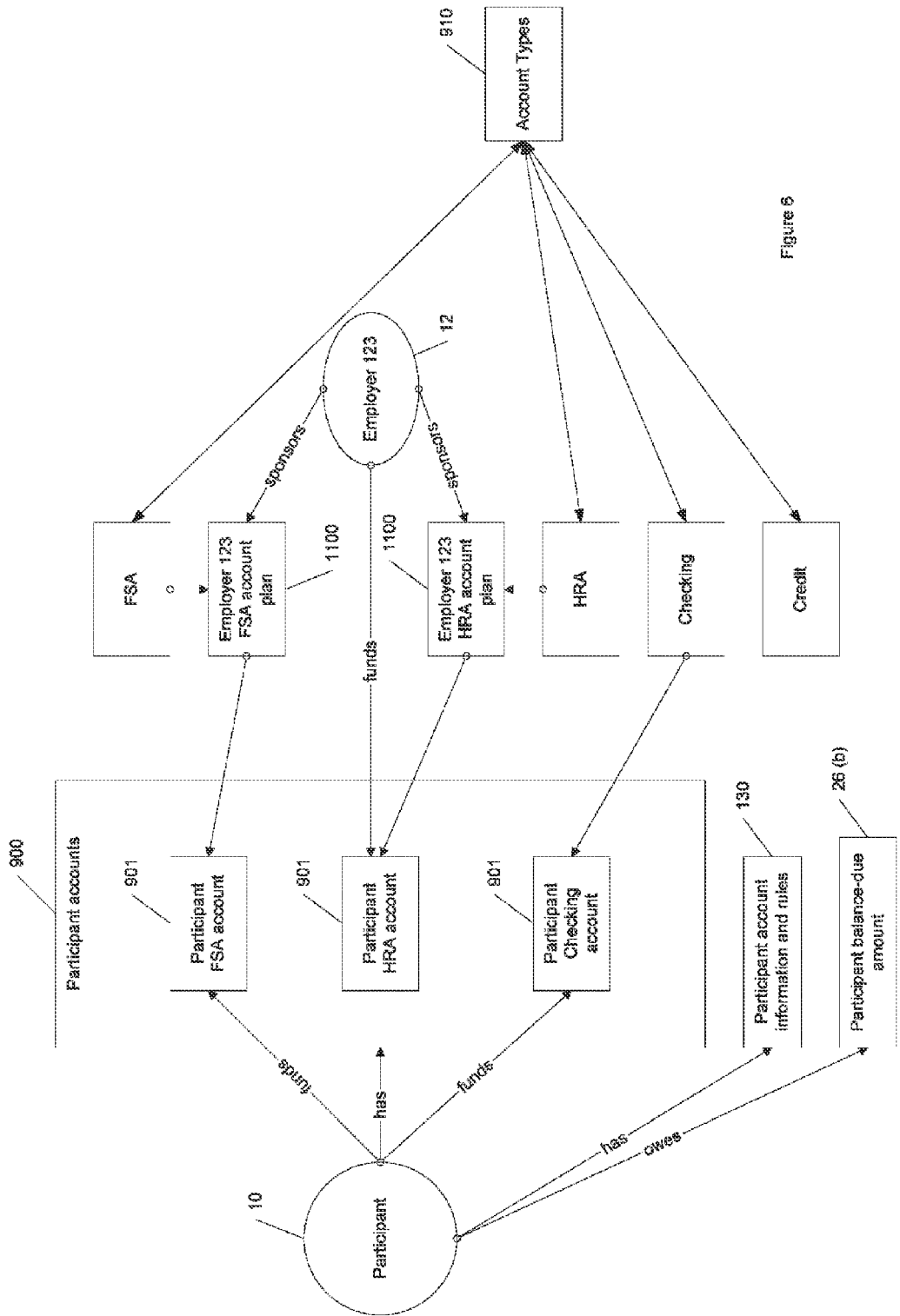
FIG. 6 is a diagram showing the plurality of accounts within the participant's set of accounts that may be used for providing payment.

FIG. 6 is a diagram showing the plurality of accounts 901 within participant's set of accounts 900 that may be used for providing payment. The participant 10 typically funds FSA accounts 901 of participant account set 900, and the employer 12 typically funds HRA accounts 901 within participant account set 900 that belong to an employer sponsored account plan 1100. A participant balance-due amount 26(*b*) can be paid from any of the accounts 901 within participant account set 900, and that decision is governed by participant account(s) information and rules 130. Each participant account 901 may be linked to one or more account types 910, such as HRA, FSA (or other TAAs), Checking, Savings, Credit, and others. The participant account(s) information and rules 130 can govern each account type 910 differently, and can govern the priority of payment accounts 901. The account types 910 are dynamic and may be added to over time.

Figure 7:
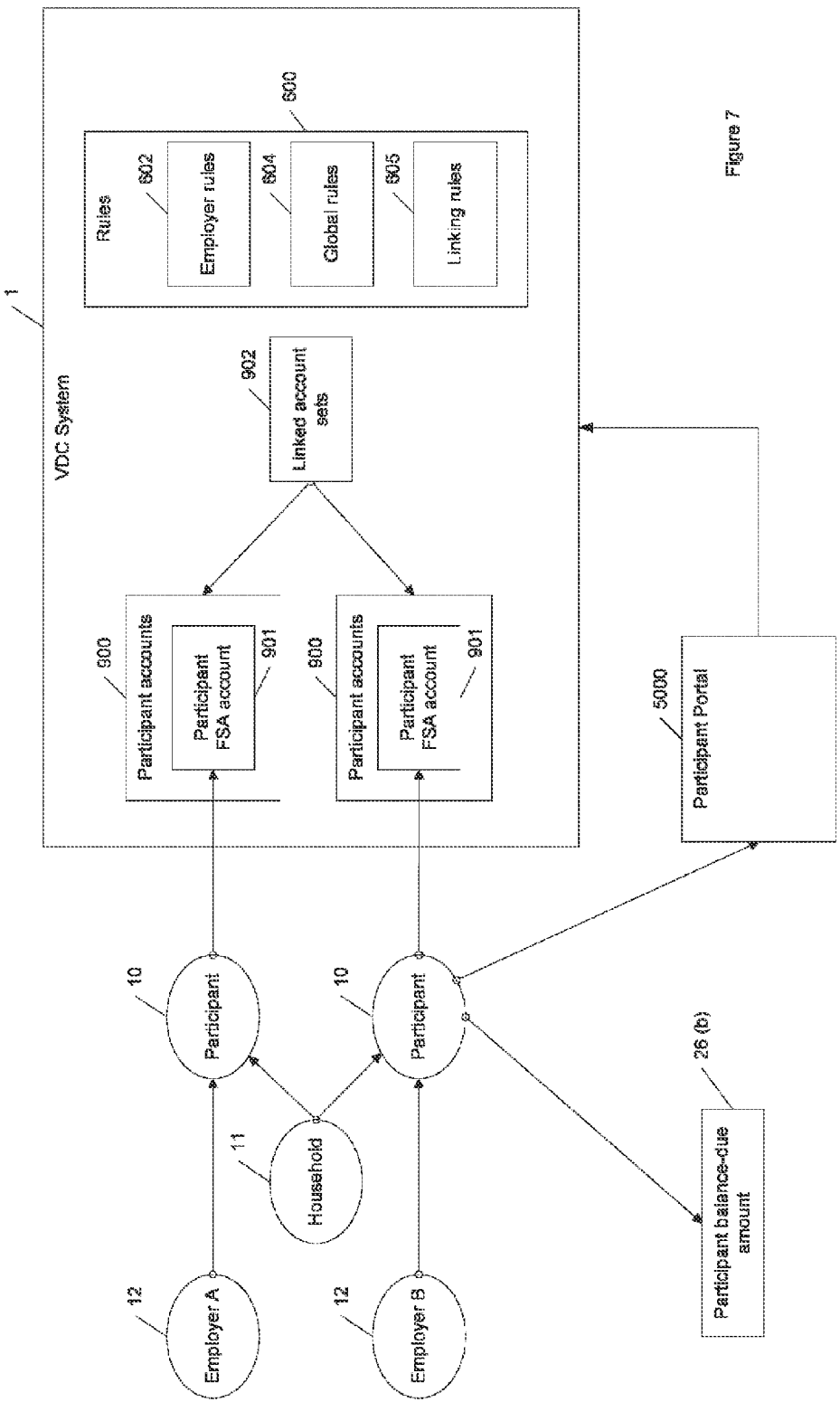
FIG. 7 is a diagram showing how joint accounts can be configured with the present invention.

FIG. 7 is a diagram showing how joint accounts can be configured with the present invention. It is possible to have two participant's 10 in the same household 11 (as defined by IRS) working for different employers 12 that would like to have accounts 901 within their respective account sets 900 linked for VDC system 1 processing purposes, such as for payment of participant balance-due amount(s) 26(*b*) from more than one account set 900 of different participants 10. Through the participant portal 5000 (see FIG. 13 below) two or more participants 10 within the same household 11 can link 902 their account sets 900 together. There may be linking rules 605 associated with the link 902 between the account sets 900 of two or more participants 10 within the same household 11, such as the priority of payment from the account sets 900. Participant 10 would specify the priority in the linking rules 605 for which participants' account set 900 to use first during VDC adjudication processing. There may be global rules 604 governing and restricting how household linkages 902 take place so that invalid linking, like linking two or more participants 10 from different households 11 will not be allowed. There may be other rules 600, such as employer rules 602, which govern the linking process as well.

Figure 8:
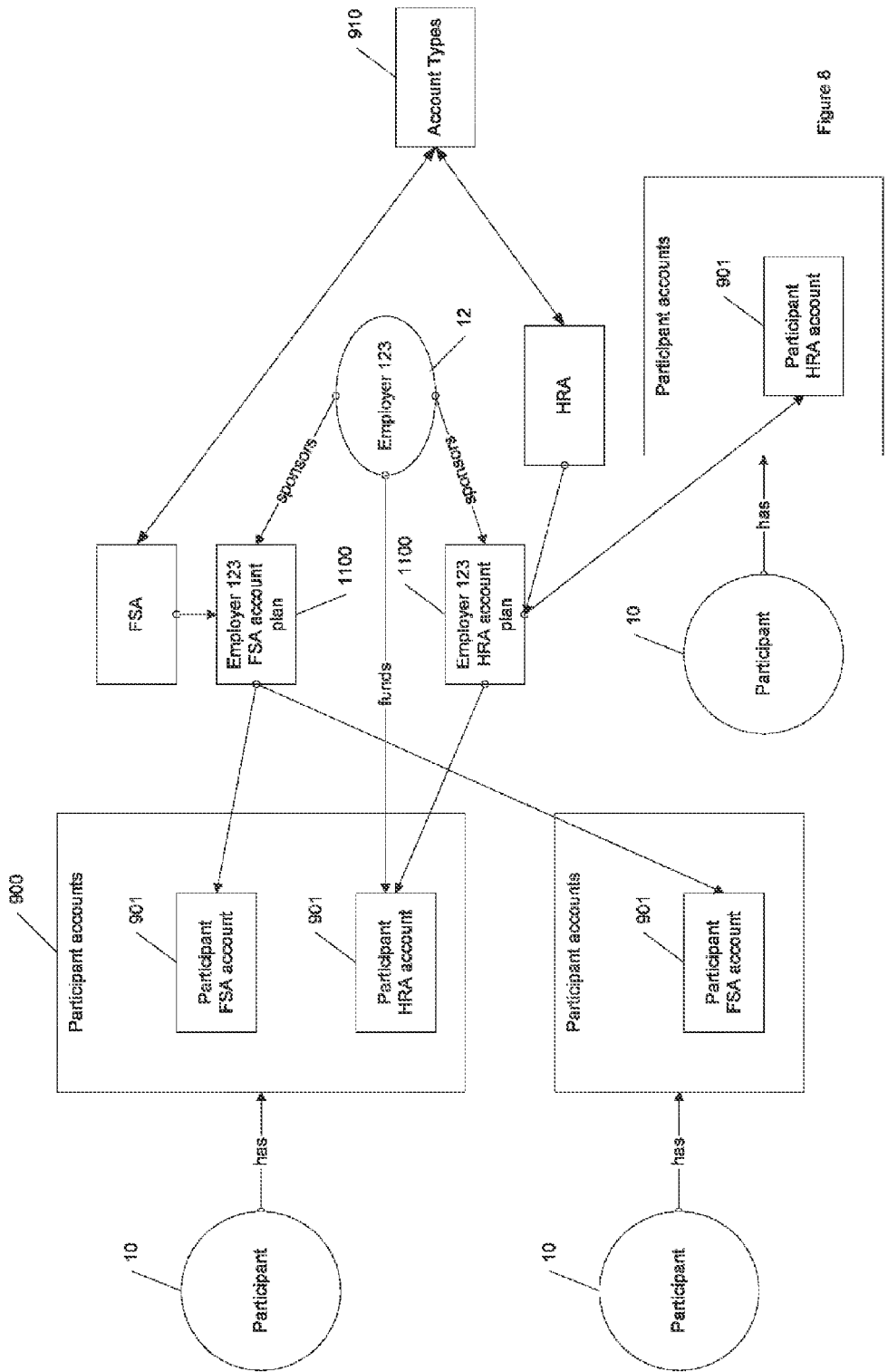
FIG. 8 is a diagram showing some of the relationships between the participant account(s) that are TAAs and employers that are supported with the present invention.

FIG. 8 is a diagram showing some of the relationships between participant account(s) 901 that are TAAs and employers 12 that are supported with the present invention. TAAs must be sponsored by an employer 12. An employer 12 may sponsor one or more account types 910, under an employer sponsored account plan 1100. One or more participants 10 may opt into an employer sponsored account plan 1100. An employer must set up a participant account 901 for each participant 10 that opts into an employer sponsored account plan 1100. Employer 12 may update any relevant information within account(s) 901 that are employer sponsored accounts 1100, such as account status to disable an inactive account 901.

Figure 9:
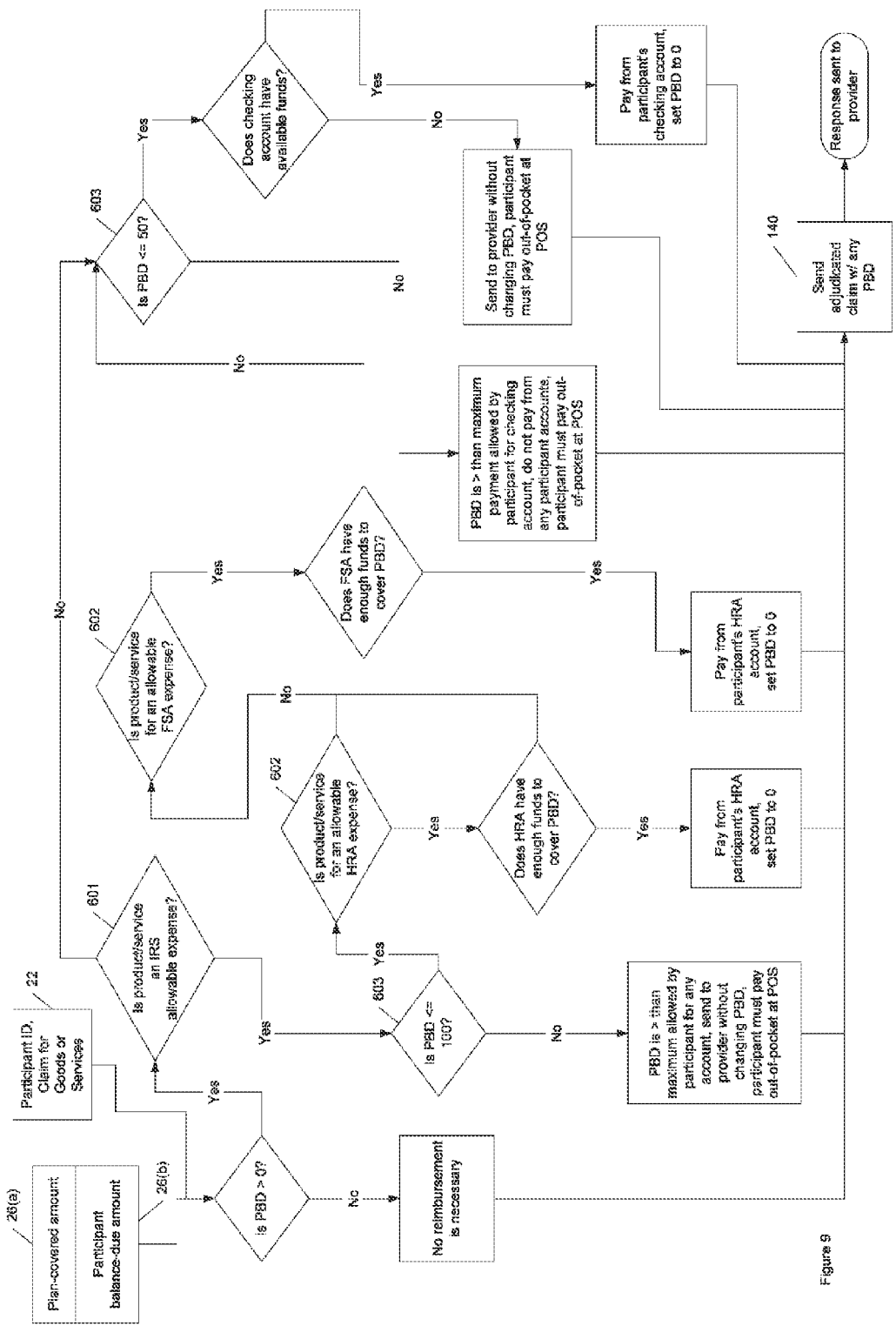
FIG. 9 is a diagram showing a sample set of participant account information and rules.

FIG. 9 is a diagram showing a sample set of participant account information and rules 130. During the VDC virtual claim adjudication process, the VDC system 1 uses the contents of message 22 (participant id, claim for goods or services) and message 26 (plan-covered amount 26(*a*), participant balance-due amount 26(*b*)) in conjunction with the participant account information and rules 130 to adjudicate the participant balance-due amount 26(*b*) and create a virtual claim 40(*a*) on behalf of the participant 10. The diagram illustrates how the VDC system 1 may adjudicate a virtual claim 40(*a*) based on sample rules that have been defined by the employer 12 and the participant 10. In this example, the participant has created a participant rule 603 that no claims over $100 may be reimbursed from any TAA. The participant 10 created a second participant rule 603 that no claims over $50 may be paid directly from the participant's checking account 901. There is a set of IRS rules 601 that govern which products and services are allowable IRS expenses for TAAs. The employer 12 created employer rules 602 for what products and services are allowed under the employer-sponsored HRA. The employer 12 also created employer rules 602 for what products and services are allowed under the employer-sponsored FSA.

Figure 10:
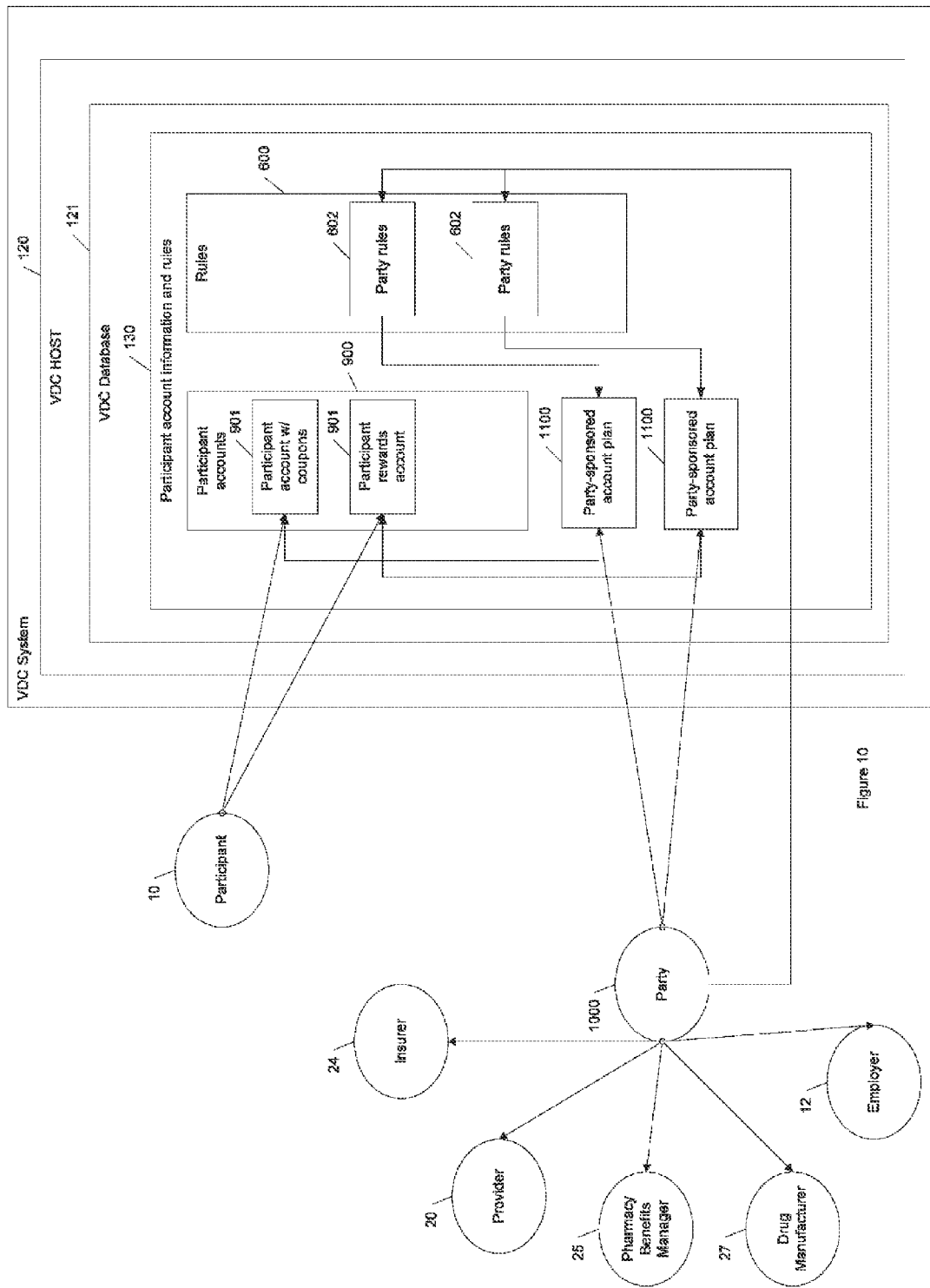
FIG. 10 is a diagram showing some of the types of discount, incentive, and reward account plans that may be delivered by any interested party with the present invention.

FIG. 10 is a diagram showing some of the types of discount, incentive, and reward account plans 1100 that may be delivered by any interested party 1000 with the present invention. A party 1000 may sponsor one or more programs, which are run as party-sponsored account plans 1100. The party-sponsored account plan 1100 is governed and executed by party-sponsored rules 602 that are established by the party 1000 via the employer portal (see FIG. 11 below). A party 1000 may typically be an employer 12, but may also be any interested party, including but not limited to, an insurer 24, a provider 20, a pharmacy benefits manager 25, or a drug manufacturer 27. Accounts 901 are established by the party 1000 for each participant 10 in the party-sponsored account plan 1100. The party rules 602 can effect the addition or removal of participants 10 from a party-sponsored account plan 1100 via an update transaction (see FIG. 5) during the virtual claim adjudication process. Participants 10 may also be added to or removed from a party-sponsored account plan 1100 via batch program processing (see FIG. 25 below). The participant account 901 balance may represent currency, a points total, coupons, transaction totals, or any other item that is applicable for the party-sponsored account plan 1100. The party-sponsored account plan 1100 may provide a discount for a particular product, a discount based on dollars spent on prior purchases, a product rebate, percent off incentives for purchases, electronic coupons for particular products, electronic coupons for a specific dollar amount towards purchases, etc.

Figure 11:
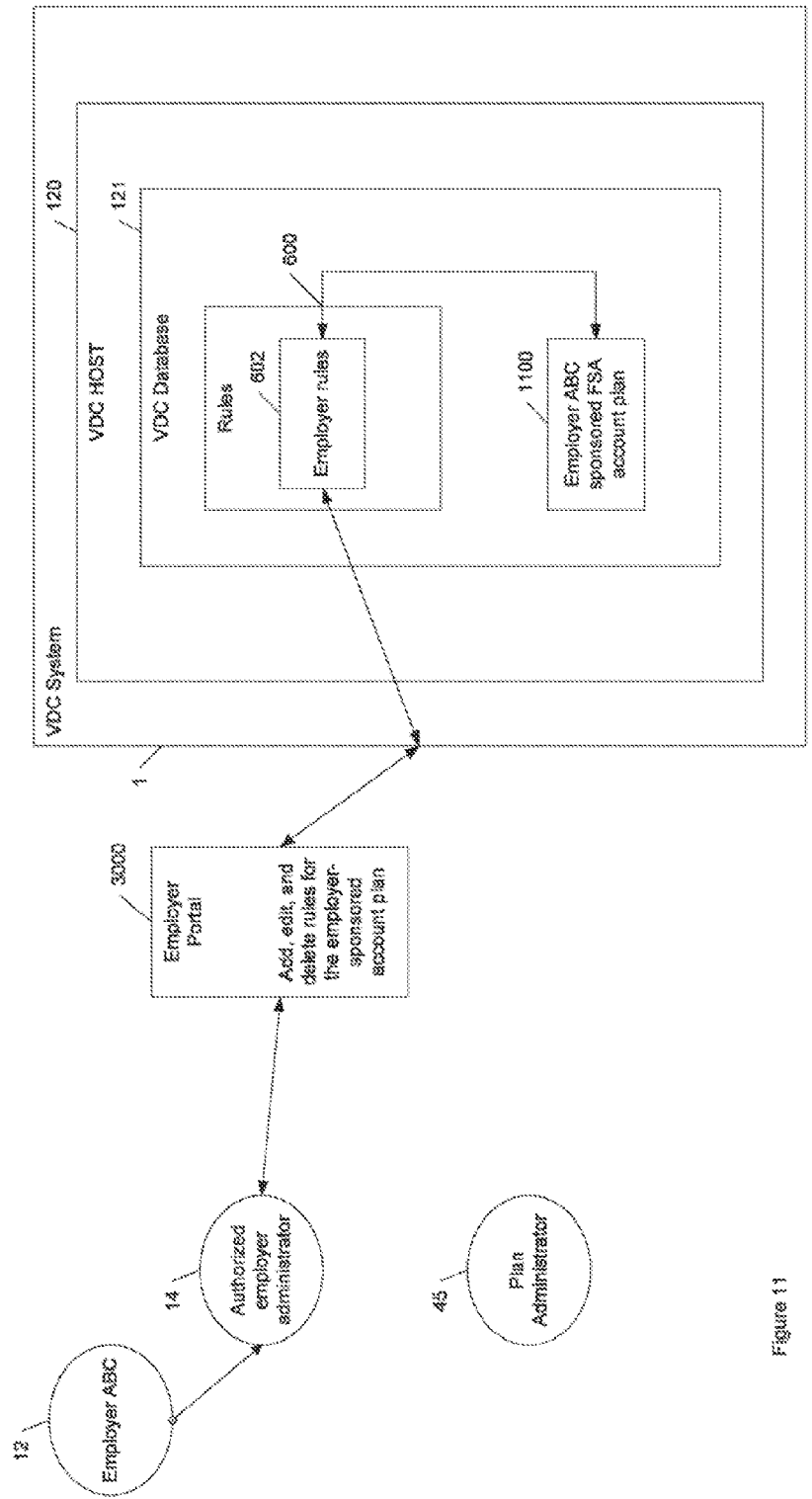
FIG. 11 is a work flow diagram showing how rules for employer-sponsored account plans are configured using the present invention.

FIG. 11 is a work flow diagram showing how rules for employer-sponsored account plans 1100 are configured using the present invention. VDC System 1 moves the burden of setup and verification of the employer's account plan rules 602 from the PA 45 to the employer 12. Traditionally, while the employer 12 creates the employer's account plan rules 602, the PA 45 handles the setup and verification of the employer's account plan rules 602. This sometimes results in costly legal battles because each employer 12 may have specific rules 602 under each employer sponsored account plan 1100 and the communication of employer account plan rules 602 from the employer 12 to the PA 45 is done manually. Manual communication of rules 602 from employer 12 to PA 45 is subject to risk of human setup errors in the communication to PA 45 and implementation by PA 45. It is an advantage of this invention to move the responsibility for the setup and configuration of the employer account plan rules 602 from the PA 45 to the employer 12. The employer 12 can setup rules 602 interactively with the VDC employer portal 3000 for a particular employer account plan 1100. The results of the rules setup will be presented to the employer 12 through the VDC employer portal 3000. The employer portal 3000 is a standard Web application, as is commonly known in the art, that has a secure logon for authorized administrators 14 for each employer 12 and provides interactive features for viewing and editing the employer's account plan 1100 information and rules 602. The Web application is accessible to employers 12 via the Internet.

Figure 12:
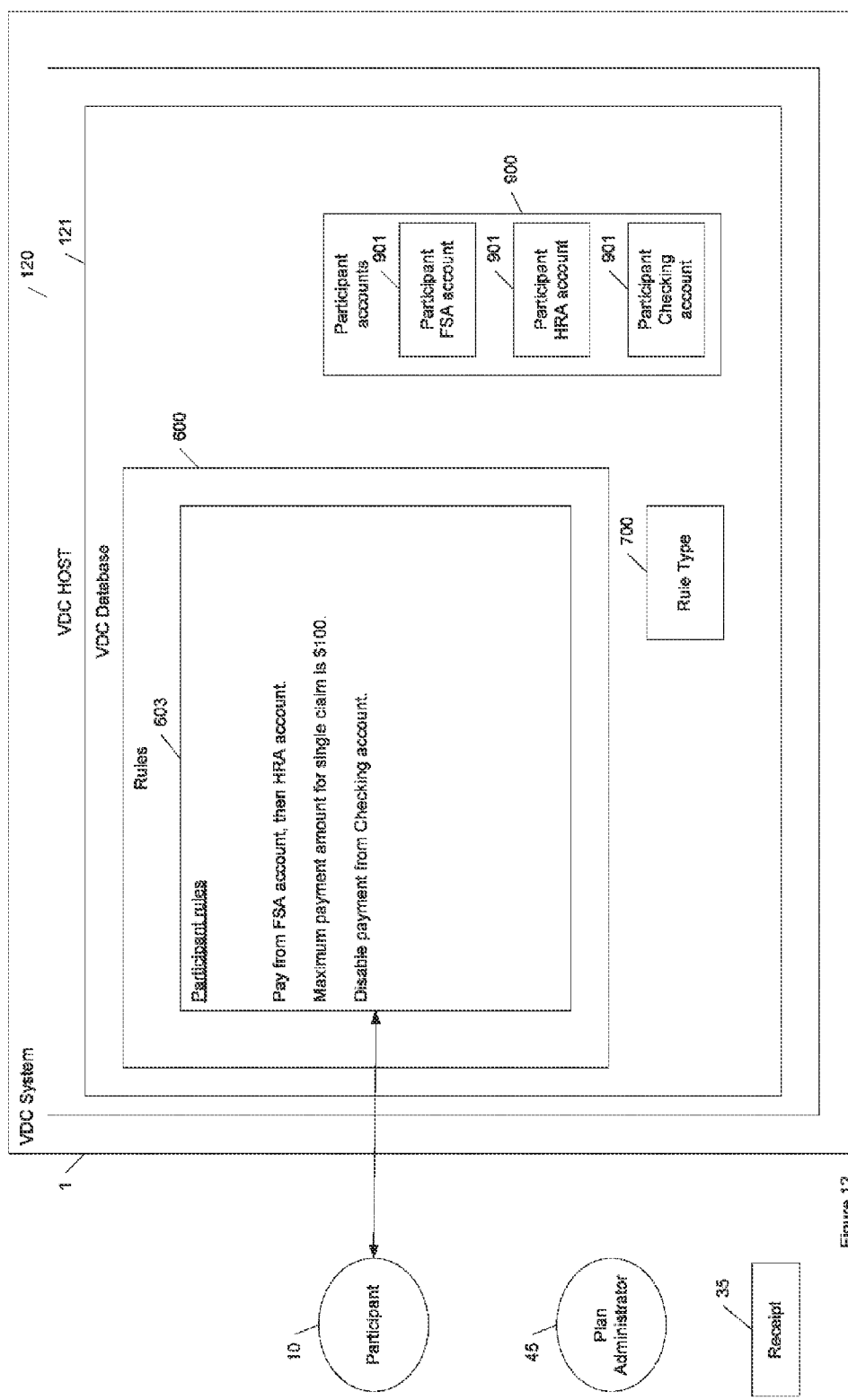
FIG. 12 is a diagram showing some of the types of participant rules that participants can configure using the present invention.

FIG. 12 is a diagram showing some of the types of participant rules 603 that participants 10 can configure using the present invention. These rules 603 are stored as data in the VDC HOST database 121 and are not hard coded in the VDC system 1. The participant 10 can view and modify only the rules 603 to their account set 900. The rules 603 give the participant 10 the same flexibility that was available with the manual means of requesting reimbursements from a TAA with a receipt 35 without the burden of saving and sending in a copy of the receipt 35 to the PA 45. For example, participant 10 can establish the priority of accounts 901 for payment of goods or services; the participant 10 can exclude payment for transactions over a certain dollar amount; or the participant 10 can disable or enable payment from a specific account 901. These a just a few of a virtual infinite number of rule 603 possibilities of all the possible rule types 700 of participant rules 603 supported by the VDC system 1.

Figure 13:
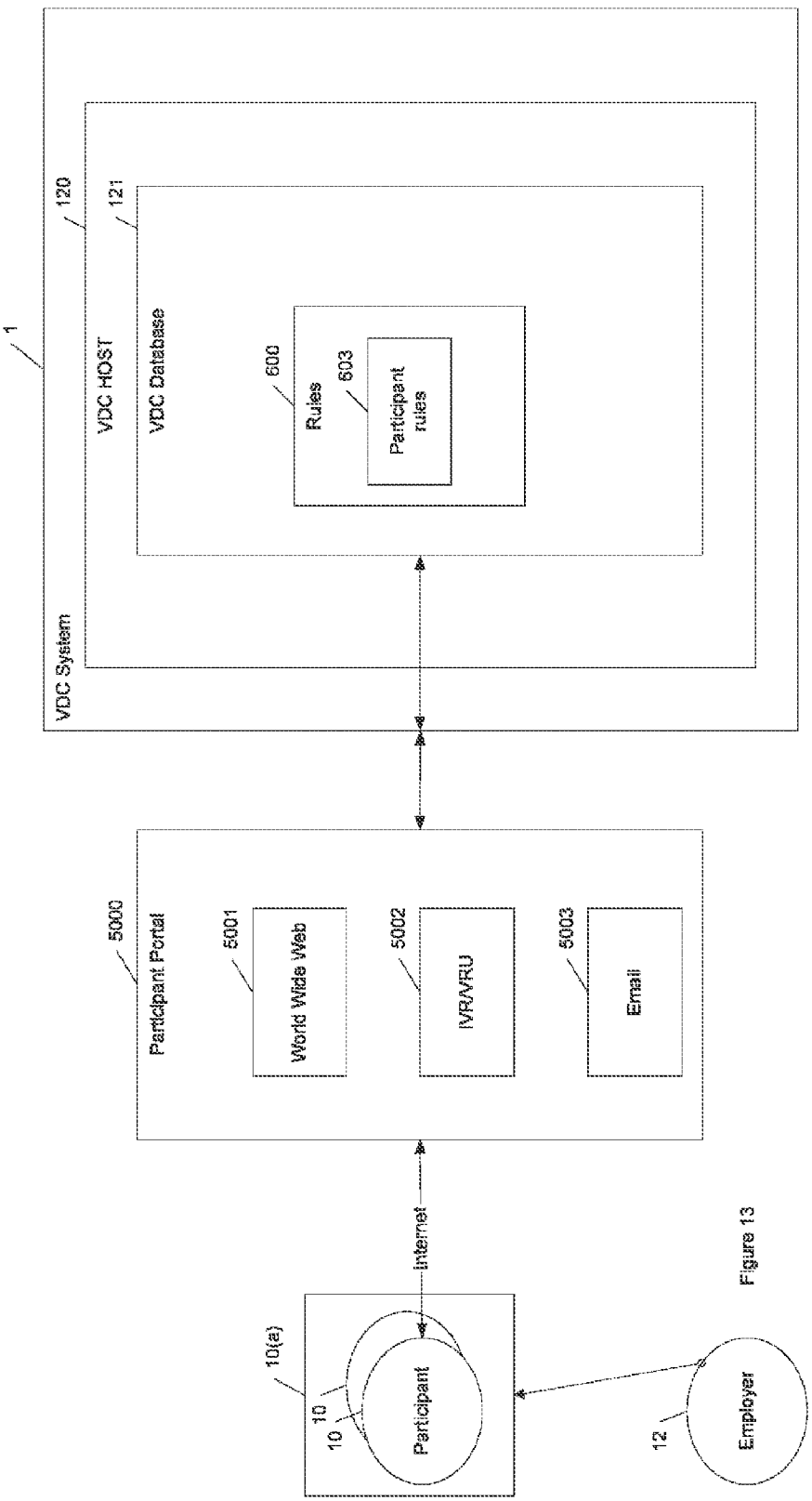
FIG. 13 is a diagram showing how participants may interact for configuration and reporting purposes with the present invention.

FIG. 13 is a diagram showing how participants 10 may interact for configuration and reporting purposes with the present invention. The VDC system 1 provides a participant portal 5000 for such purposes. The participant portal 5000 is a custom Web application, as is commonly known in the art, which has a secure logon for authorized participants 10(*a*) for each employer 12 and provides interactive features for configuring options such as participant rules 603 and viewing and downloading information. The Web application is accessible to participants 10(*a*) via the Internet. This portal 5000 may allow multi-channel interaction with the VDC HOST database 121 which includes, but is not limited to, interaction via the World Wide Web 5001, interaction via interactive voice response units (IVR/VRUs) 5002, and interaction via email 5003.

Figure 14:
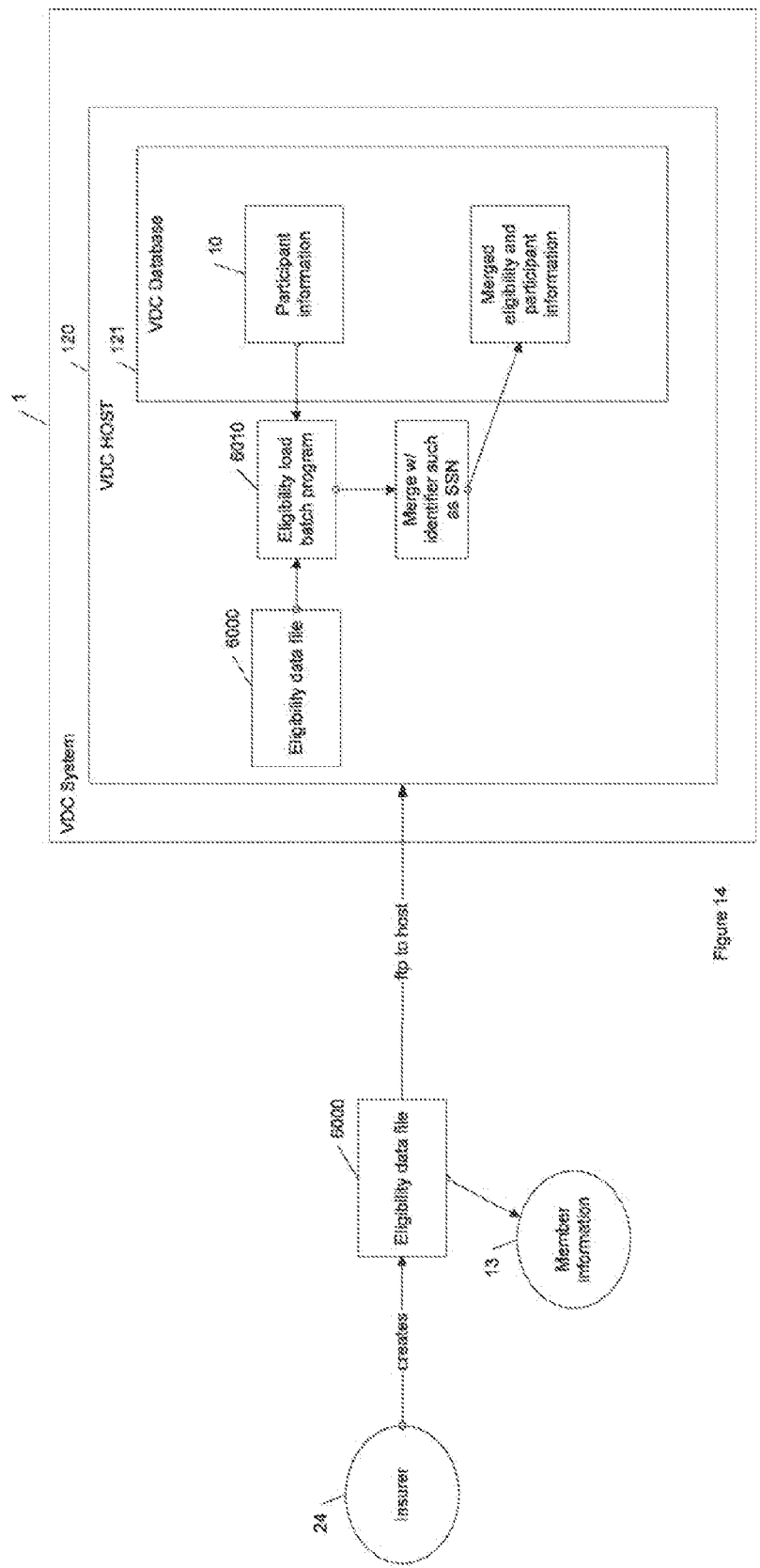
FIG. 14 is a workflow diagram showing how insurer eligibility data is loaded into the VDC system.

FIG. 14 is a workflow diagram showing how insurer eligibility data 6000 is loaded into the VDC system 1. The insurer 24 may generate an extract file of eligibility data 6000 periodically, such as daily. The eligibility data 6000 is comprised of information such as members 13 covered by the insurer 24

(each member 13 who is eligible for benefits) and what kind of coverage each member 13 has. The extract file of eligibility data 6000 will be electronically transferred to the VDC HOST 120 via standard means such as FTP. A batch program process 6010, written in a language that is commonly known in the art, such as C and/or Oracle PL/SQL, will run on the VDC HOST 120 to load the data contained in the extract file of eligibility data 6000 by merging with existing participant 10 data in the VDC database 121. An identifier such as the participant social security number will be used to match the extract file of eligibility data 6000 with the existing participant 10 data in the VDC database 121.

Figure 15:
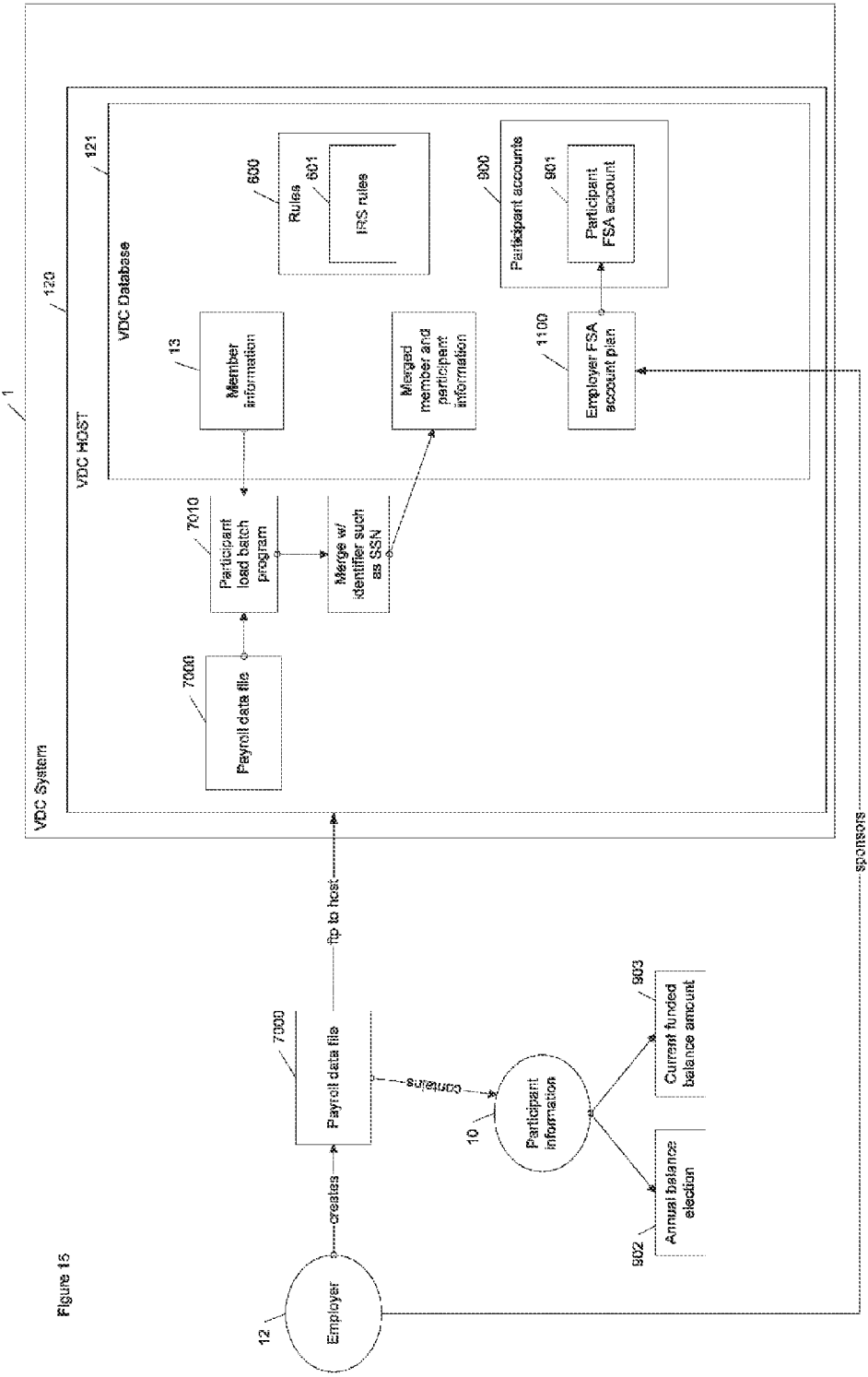
FIG. 15 is a workflow diagram showing how an employer's participant data is loaded into the VDC system.

FIG. 15 is a workflow diagram showing how an employer's 12 participant 10 data is loaded into the VDC system 1. The employer's payroll file 7000 is typically used to load participant 10 data into the VDC System 1. An employer's payroll file 7000 may be generated periodically, such as daily, by the employer 12. The payroll file 7000 contains information such as who the active participants 10 are for each employer sponsored plan 1100, and what each participant's 10 total annual balance election 902 and current funded balance amount 903 are for their participant account 901. The employer payroll file 7000 may be transferred to the VDC HOST 120 via standard means such as FTP. A batch program process 7010 may run to load the employer's payroll file 7000 and merge the payroll file 7000 with existing member 13 data in the VDC HOST database 121. An identifier such as the participant social security number will be used to match the data from the payroll file 7000 and the existing member 13 data in the VDC HOST database 121. It will be the responsibility of the employer 12 to ensure that additions, deletions, and other changes to the participant 10 data contained in the VDC HOST database 121 as a result of the payroll file 7000 merger are managed according to applicable rules, such as IRS rules 601 governing event changes for TAAs.

Figure 16:
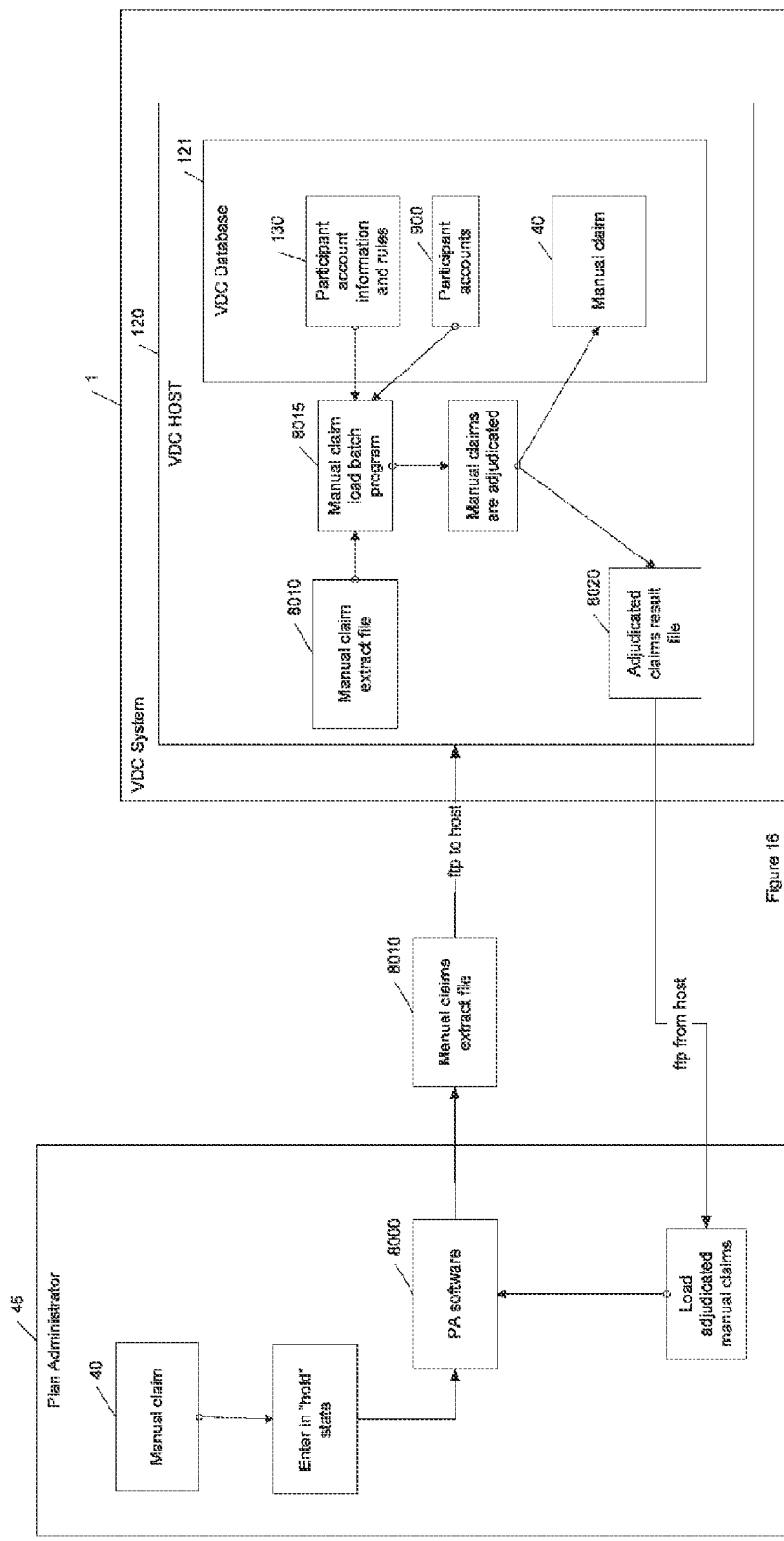
FIG. 16 is a workflow diagram showing how manual claims are processed in conjunction with the present invention.

FIG. 16 is a workflow diagram showing how manual claims 40 are processed in conjunction with the present invention. Manual claims 40 are typically entered and adjudicated using the PA's software 8000, such as DataPath or P+W Software. The manual claims 40 are entered in the PA's system in a "hold" state. A manual claim extract file 8010 is created by various means such as exporting the data from the PA's software 8000 into a comma-delimited file. The manual claim extract file 8010 is then transferred to the VDC HOST 120 via standard means such as FTP. The VDC System 1 batch processing program 8015 individually adjudicates each manual claim 40 using the participant account(s) information and rules 130 for each participant account set 900, and creates an adjudicated claims result file 8020 containing the results of the claim adjudication. The adjudicated manual claims 40 are stored in the VDC HOST database 121 for reporting and other purposes. The PA 45 retrieves the adjudicated claims result file 8020 and imports the adjudicated claim results into the PA software 8000. The PA 45 then resumes normal processing such as sending reimbursement payments and statements on account activity to participant 10.

Figure 17:
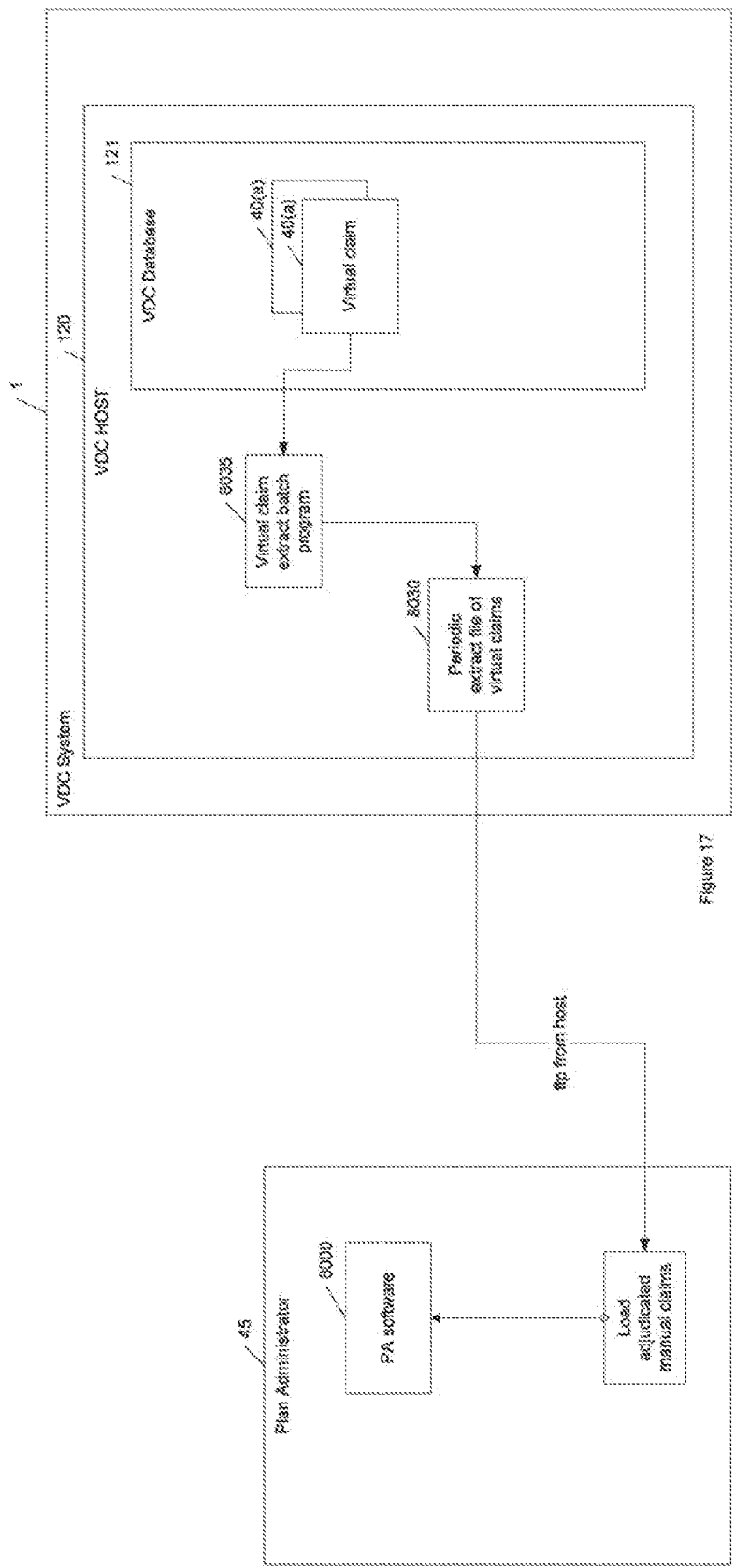
FIG. 17 is a diagram showing how the present invention can provide other parties, such as a PA (or TPA), with adjudicated virtual claim information.

FIG. 17 is a diagram showing how the present invention can provide other parties, such as a PA 45 (or TPA), with adjudicated virtual claim 40(*a*) information. The VDC System 1 may generate a periodic extract file 8030 of virtual claims for reimbursement 40(*a*) for a particular PA 45 by running a virtual claim extract batch program 8035. The PA 45 may retrieve, via standard means such as ftp, the extract file of virtual claims 8030 from the VDC HOST 120. The PA 45 may import the extract file of virtual claims 8030 into the PA's software 8000 for recordkeeping, reporting, consolidated statement viewing and mailing, or other purposes.

Figure 18:
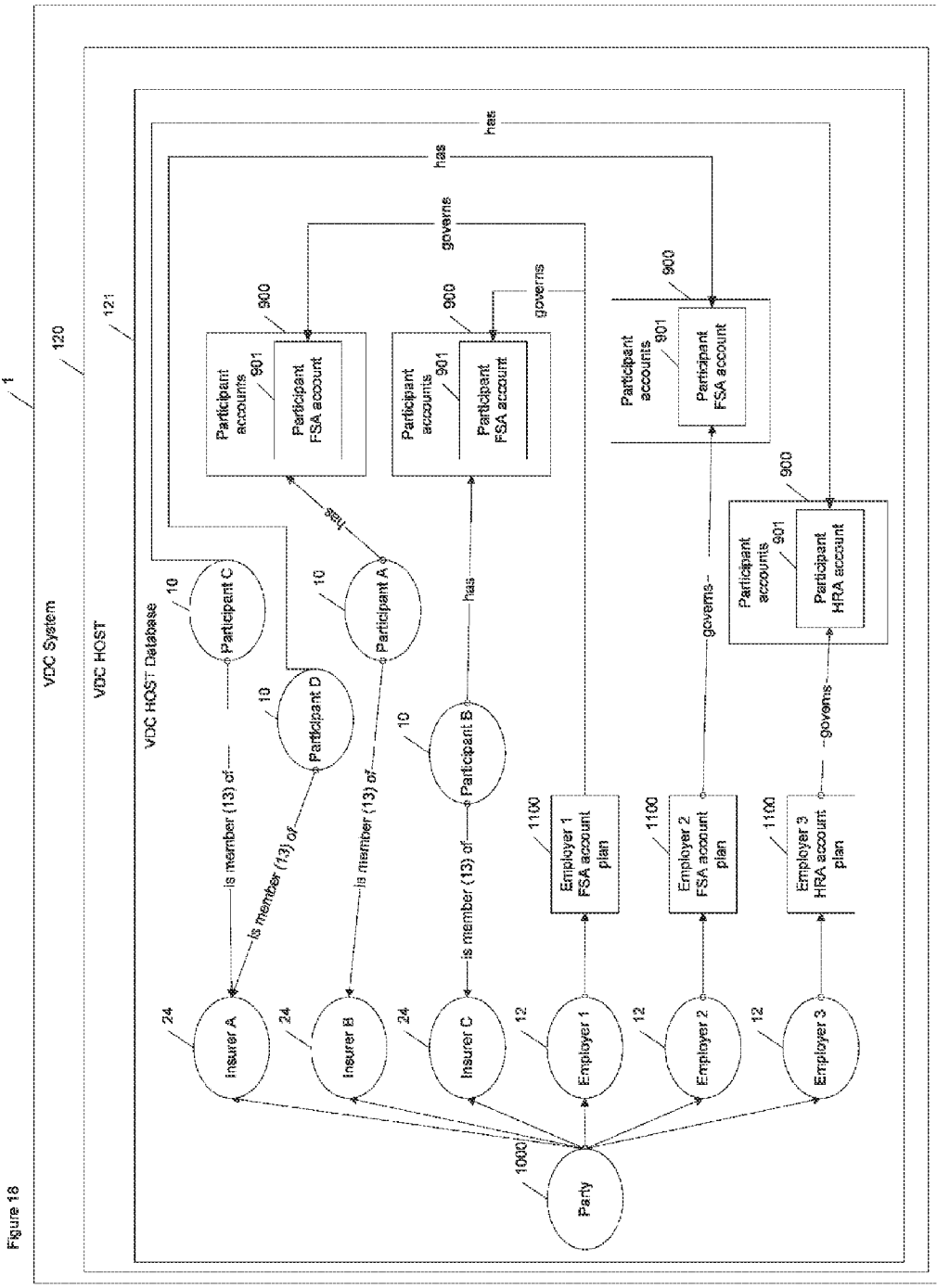
FIG. 18 is a diagram showing how the present invention accommodates a plurality of parties (insurers, employers, pharmacy benefit managers, etc.) within the context of a single instance of the VDC system.

FIG. 18 is a diagram showing how the present invention accommodates a plurality of parties 1000 (insurers, employers, pharmacy benefit managers, etc.) within the context of a single instance of the VDC system 1. For example, a single VDC HOST database 121 can accommodate multiple insurers 24 and multiple employers 12. Each employer 12 can sponsor account plans 1100 for participants 10 who are members 13 of different insurers 24. All this information and relationships are stored within a single VDC HOST database 121 and the integrity, privacy, and accessibility of this information is governed by data security as is described in FIG. 26 below.

Figure 19:
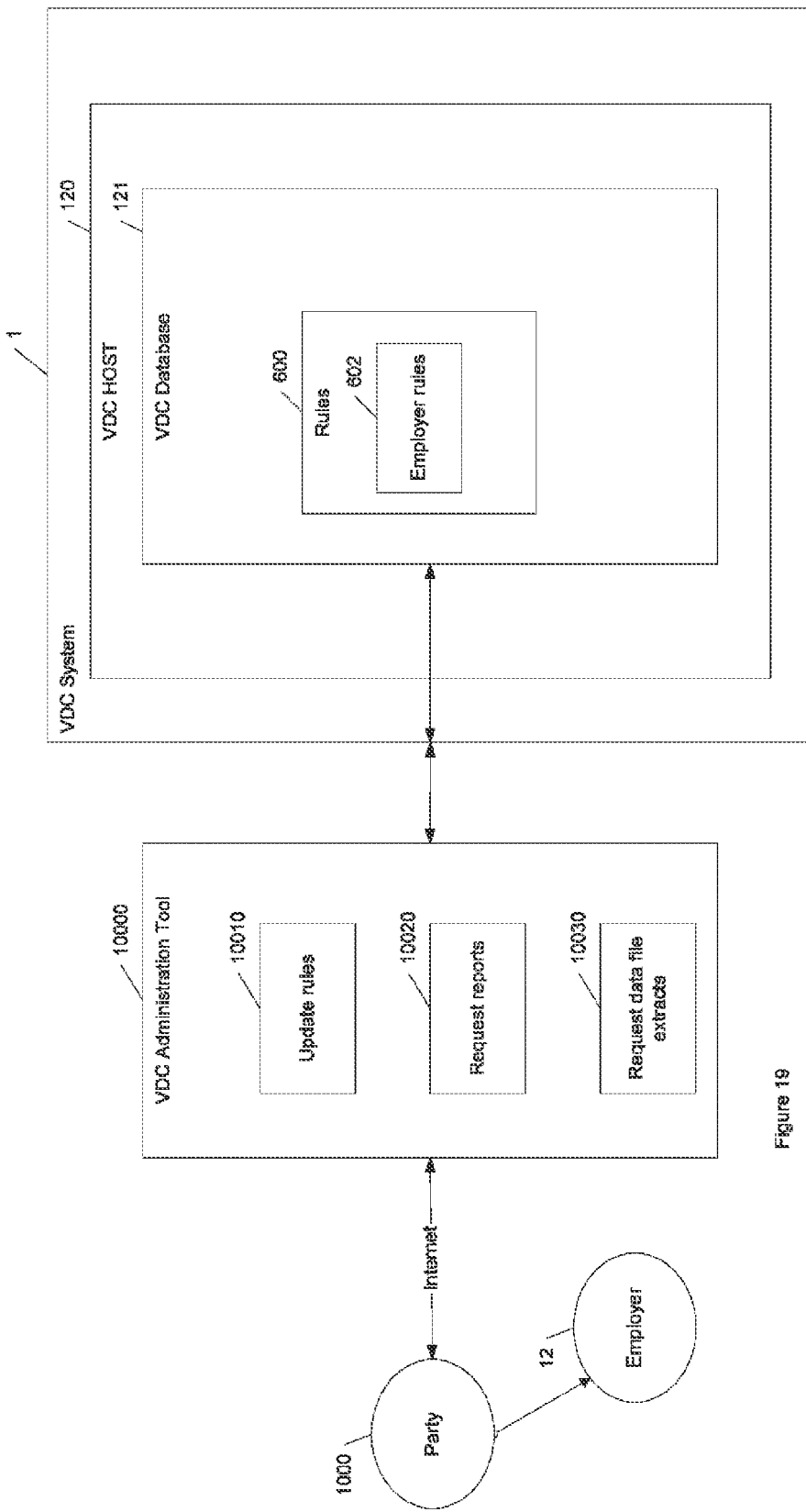
FIG. 19 is a workflow diagram showing how parties may interact with the VDC system to configure rules, execute reports, and extract information.

FIG. 19 is a workflow diagram showing how parties 1000 may interact with the VDC system 1 to configure rules 600, execute reports, and extract information. Each party 1000, such as an employer 12, is given secure, restricted access to the VDC HOST 120 and VDC HOST database 121 via the VDC administration tool 10000. The VDC administration tool 10000 is a custom Web application, as is commonly known in the art, which has a secure logon for authorized parties 1000 and provides interactive features for configuring options such as employer account plan rules 602 and viewing and downloading or uploading information. The Web application is accessible to parties 1000 via the Internet. The VDC administration 10000 tool allows the party 1000 to perform tasks such as 'update rules' 10010, 'request reports' 10020, and 'request data file extracts' 10030.

Figure 20:
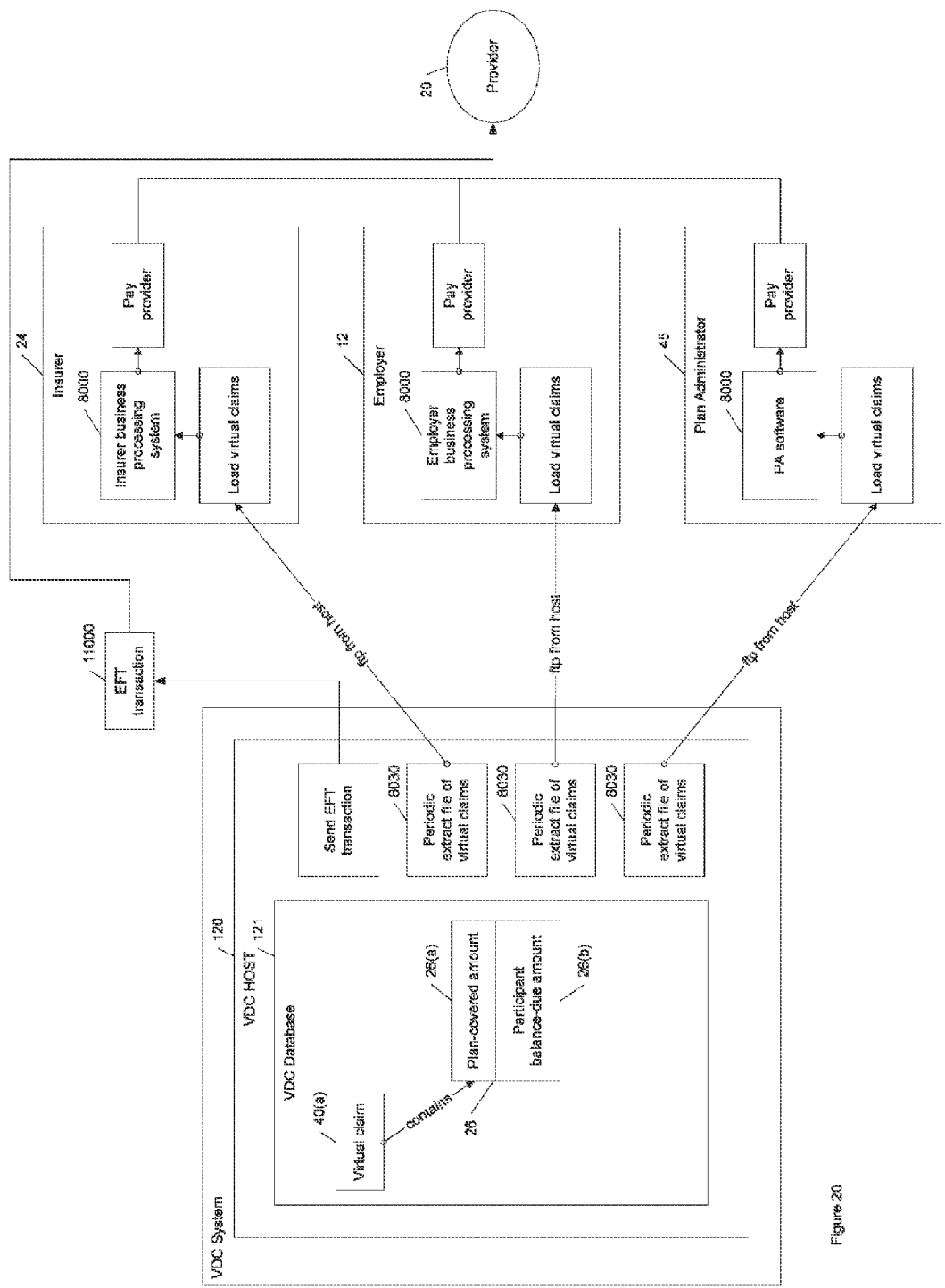
FIG. 20 is a workflow diagram showing some of the options for paying providers for the participant balance-due amounts captured as virtual claims for reimbursement by the VDC system.

FIG. 20 is a workflow diagram showing some of the options for paying providers 20 for the participant balance-due amounts 26(*b*) captured as virtual claims for reimbursement 40(*a*) by the VDC system 1. In one embodiment, the VDC HOST 120 can send a daily EFT transaction 11000 for providing payment to a provider 20. In another embodiment, the VDC HOST 120 can generate a virtual claim extract file 8030 (containing the virtual claim for reimbursement 40(*a*) information) to send to the employer 12 or PA 45 (as shown in FIG. 17 above). The employer 12 or PA 45 can load the virtual claim extract file 8030 into their business processing systems and use the information to pay the provider 20. In yet another embodiment, the VDC HOST 120 can generate a virtual claim extract file 8030 to send to the insurer 24. The insurer 24 can load the virtual claim extract file 8030 into their business processing systems and use the information to pay the provider(s) 20. These are just a few means by which provider(s) 20 can be paid for VDC system 1 virtual claims for reimbursement 40(*a*) and should not be construed as a definitive list.

Figure 21:
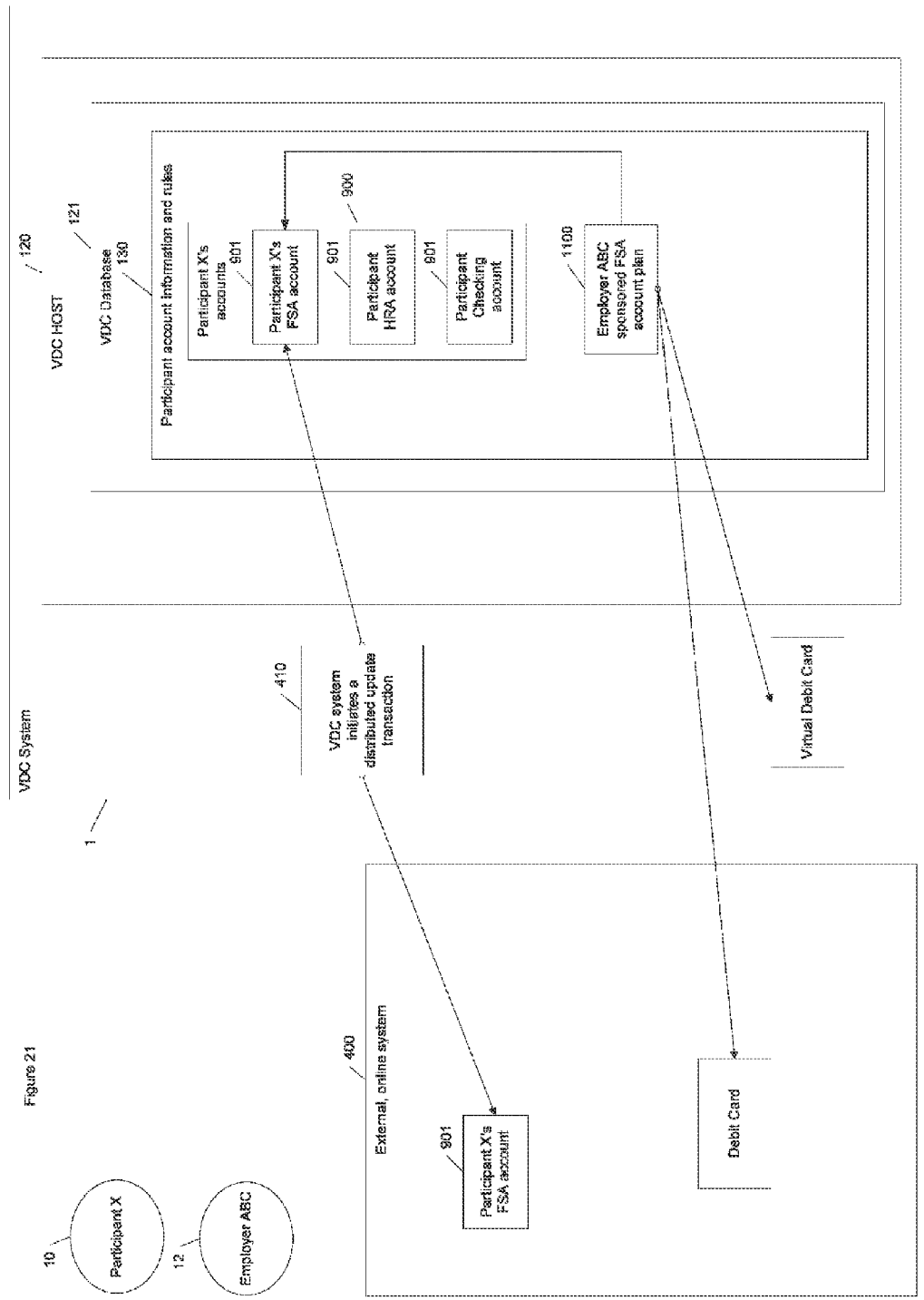
FIG. 21 is a schematic diagram showing how other real-time systems can coexist with the present invention by having the VDC system interact with an external, real-time system (such as a debit card system), and where system is the system of record for a participant account.

FIG. 21 is a schematic diagram showing how other real-time systems can coexist with the present invention by having the VDC system 1 interact with an external, real-time system 400 (such as a debit card system), and where system 400 is the system of record for a participant account 901. For example, an employer 12 may offer a participant 10 both a virtual debit card and debit card concurrently for the same employer-sponsored account plan 1100, where payment is made from the same participant account 901. Since both "card" types (virtual debit card and debit card) would be used for real-time transactions where funds would be paid from the same participant account(s) 901, it is necessary for VDC system 1 to interact appropriately with the external system of record 400 in order to maintain the integrity and consistency of the account balances. During the virtual claim adjudication process, the VDC system 1 initiates a distributed update transaction 410 with the external online system 400. In this scenario, the external online system 400 is considered to be the system of record.

Figure 22:
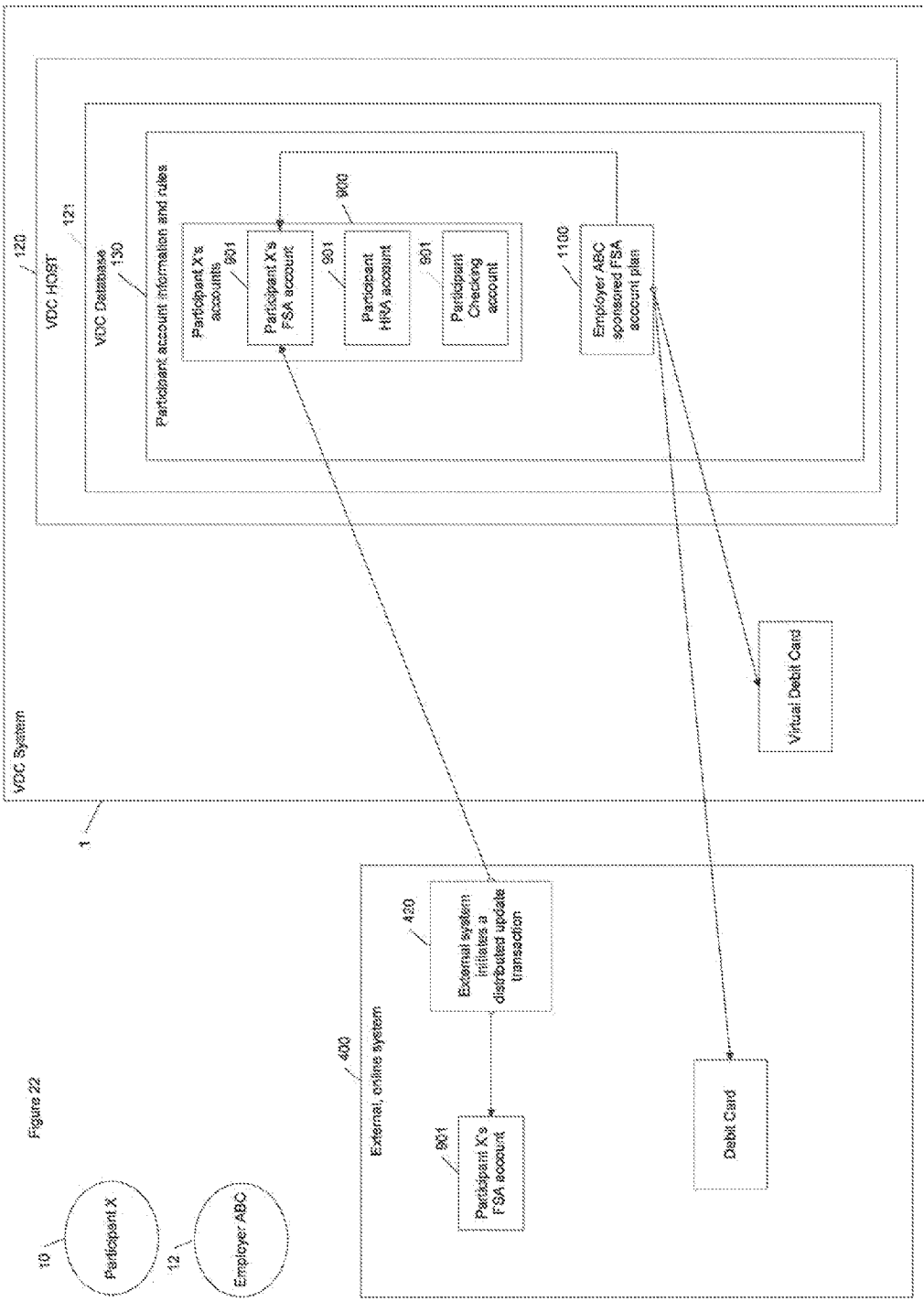
FIG. 22 is a schematic diagram showing how other real-time systems can coexist with the present invention by having the external, real-time system (such as a debit card system) interact with the VDC system, and where the VDC system is the system of record for a participant account.

FIG. 22 is a schematic diagram showing how other real-time systems can coexist with the present invention by having the external, real-time system 400 (such as a debit card system) interact with the VDC system 1, and where the VDC system 1 is the system of record for a participant account 901. For example, an employer 12 may offer a participant 10 both a virtual debit card and debit card concurrently for the same employer-sponsored account plan 1100, where payment is made from the same participant account 901. Since both "card" types (virtual debit card and debit card) are being used for real-time transactions where funds will be paid from the same account 901, it is necessary for the VDC system 1 to interact appropriately with the external, real-time system 400 in order to maintain the integrity of the account balance for the participant account 901. During the debit card claim adjudication process, the external, real-time system 400 initiates a distributed update transaction 420 with the VDC system 1. In this scenario, the VDC system 1 is the system of record.

Figure 23:
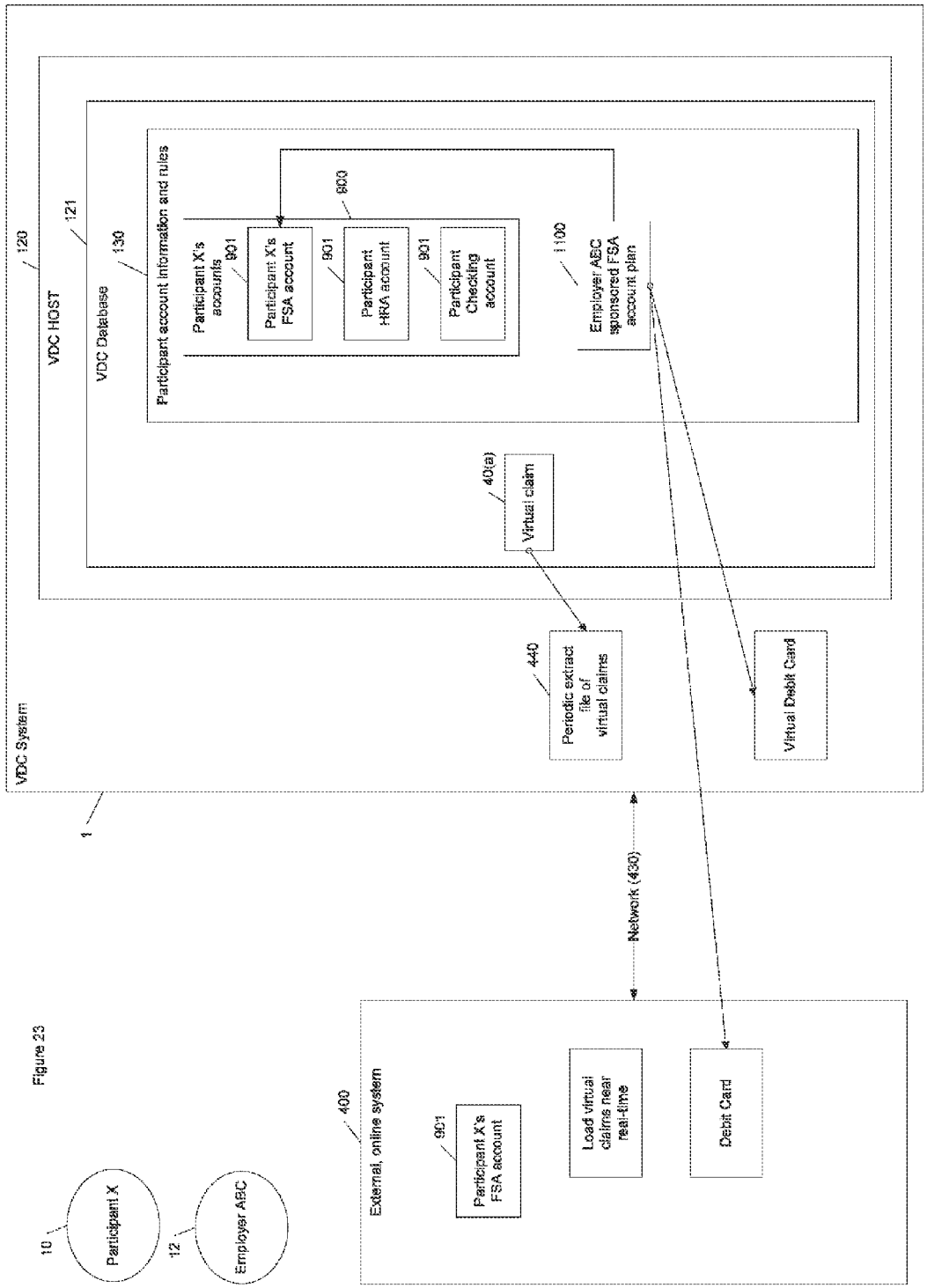
FIG. 23 is a schematic diagram showing how other real-time systems can coexist with the present invention by having the VDC system interact with an external, real-time system (such as a debit card system), and where system is the system of record for a participant account, and where a real-time, distributed transaction between the external online system and VDC system is not possible, but where the systems are accessible to each other via a network.

FIG. 23 is a schematic diagram showing how other real-time systems can coexist with the present invention by having the VDC system 1 interact with an external, real-time system 400 (such as a debit card system), and where system 400 is the system of record for a participant account 901, and where a real-time, distributed transaction between the external online system 400 and VDC system 1 is not possible, but where the systems are accessible to each other via a network 430. Upon completion of the virtual claim adjudication process, the VDC System 1 would periodically send a virtual claims file 440 containing the payment information in connection with the virtual claims to the external online system 400 for loading near real-time. The external online system 400 is considered to be the system of record. This option would be viable only if there were no possible scenarios in which a debit card claim and a virtual debit card claim (virtual claim 40(*a*)) for the same participant 10 would need to be adjudicated concurrently on the external online system 400 and the VDC system 1, respectively.

Figure 24:
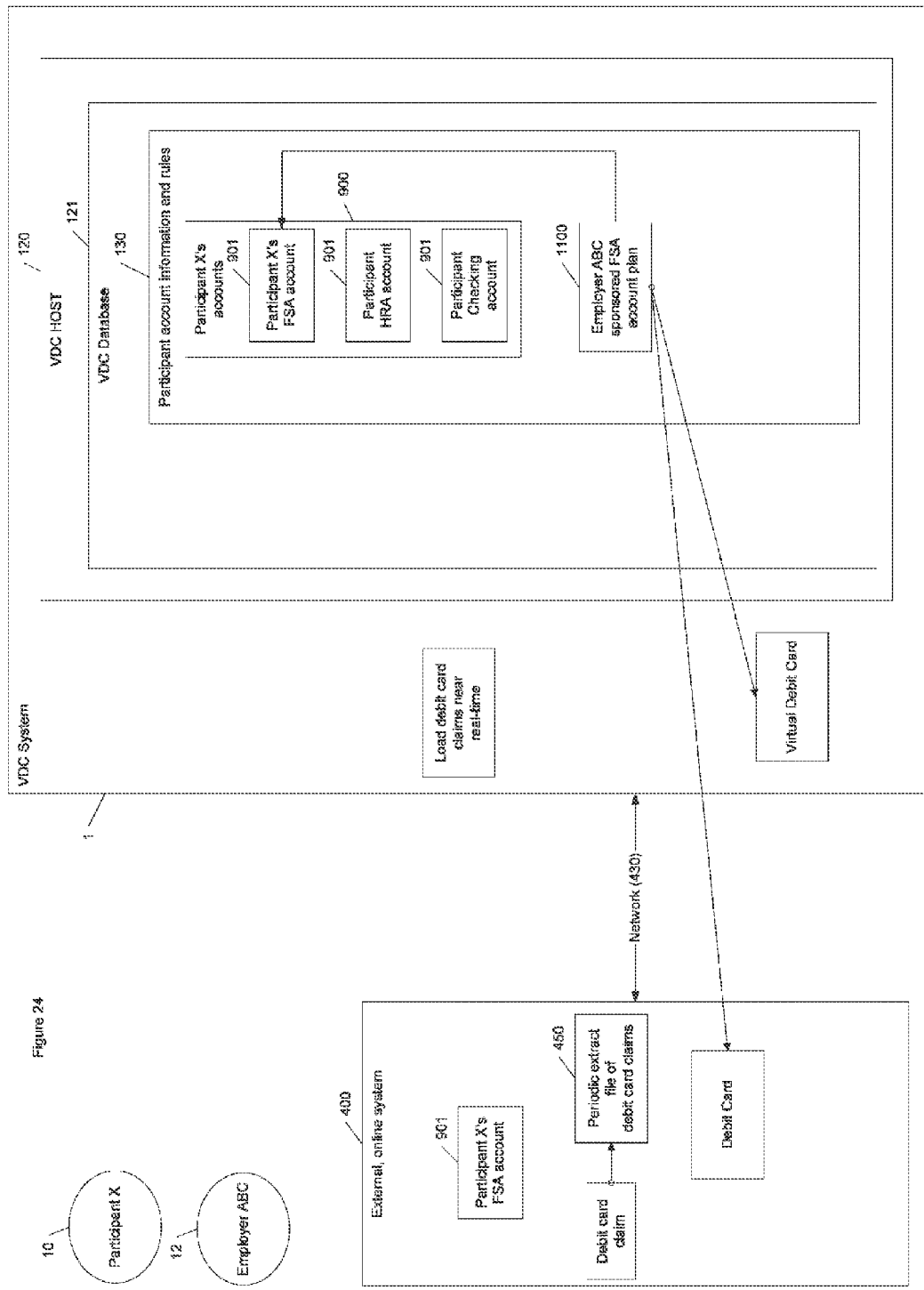
FIG. 24 is a schematic diagram showing how other real-time systems can coexist with the present invention by having the external, real-time system (such as a debit card system) interact with the VDC system, and where the VDC system is the system of record for a participant account, and where a real-time, distributed transaction between the external online system and VDC system is not possible, but where the systems are accessible to each other via a network.

FIG. 24 is a schematic diagram showing how other real-time systems can coexist with the present invention by having the external, real-time system 400 (such as a debit card system) interact with the VDC system 1, and where the VDC system 1 is the system of record for a participant account 901, and where a real-time, distributed transaction between the external online system 400 and VDC system 1 is not possible, but where the systems are accessible to each other via a network 430. Upon completion of the debit card claim adjudication process, the external online system 400 would periodically send a debit card claims file 450 containing the payment information in connection with the debit card claims to the VDC system 1 for loading near real-time. The VDC 1 system 400 is considered to be the system of record. This option would be viable only if there were no possible scenarios in which a debit card claim and a virtual debit card claim (virtual claim 40(*a*)) for the same participant 10 would need to be adjudicated concurrently on the external online system 400 and the VDC system 1, respectively.

Figure 25:
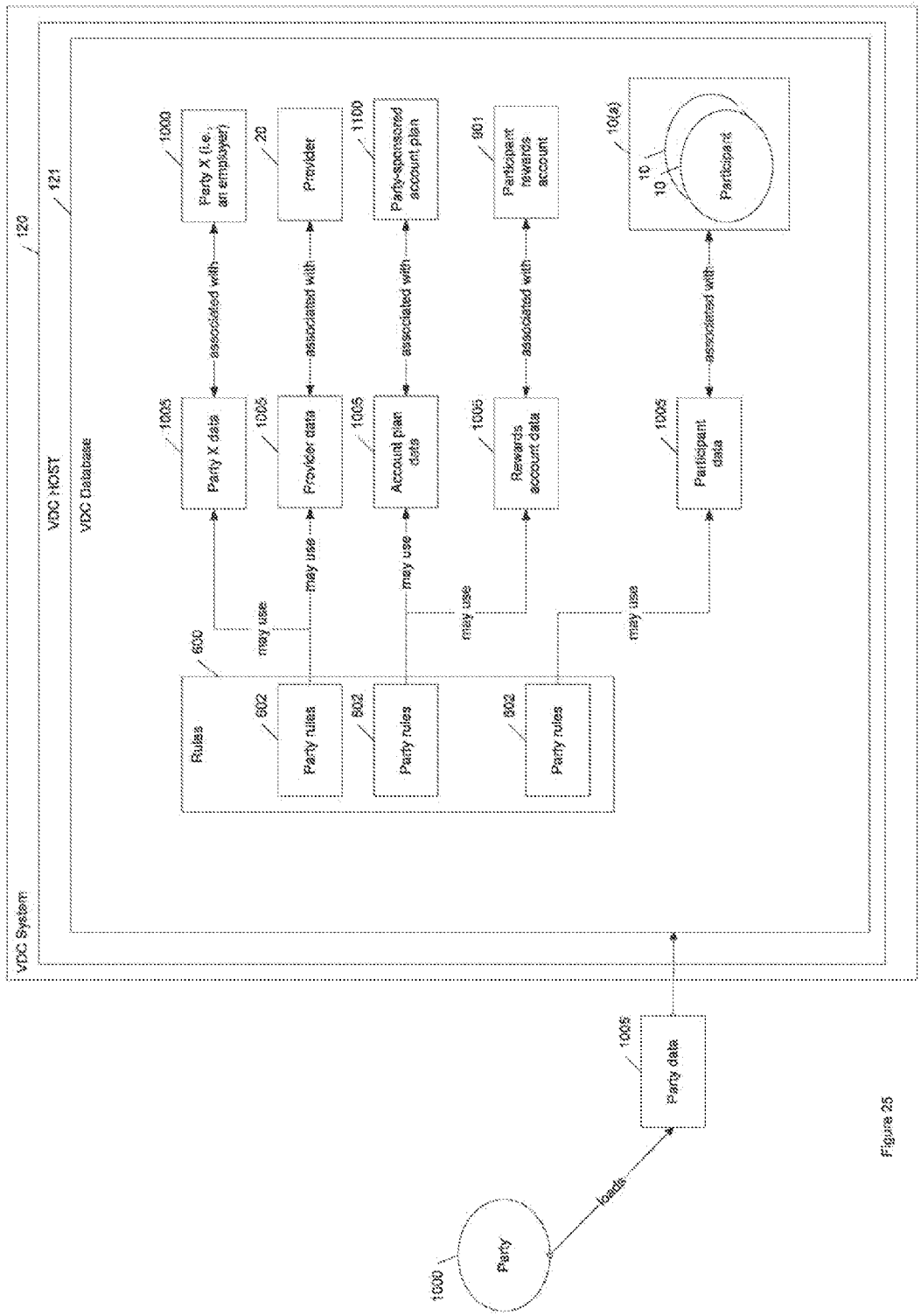
FIG. 25 is a workflow diagram showing how party data can be loaded into the VDC HOST database.

FIG. 25 is a workflow diagram showing how party data 1005 can be loaded into the VDC HOST database 121. A party 1000 may load the data using the VDC administration tool described in FIG. 19. The party data 1005 may be used in conjunction with the rules 600, such as party rules 602, during virtual claims adjudication processing. Any party 1000 can load party data 1005 it needs to be associated with a participant 10 or group of participants 10(*a*). Party data 1005 can also be associated with other information such as, but not limited to, a particular party-sponsored account plan 1100, participant account 901, party 1000, or provider 20. The data load may consist of maintenance changes (adds, deletes, or updates) to existing VDC HOST database 121 information.

Figure 26:
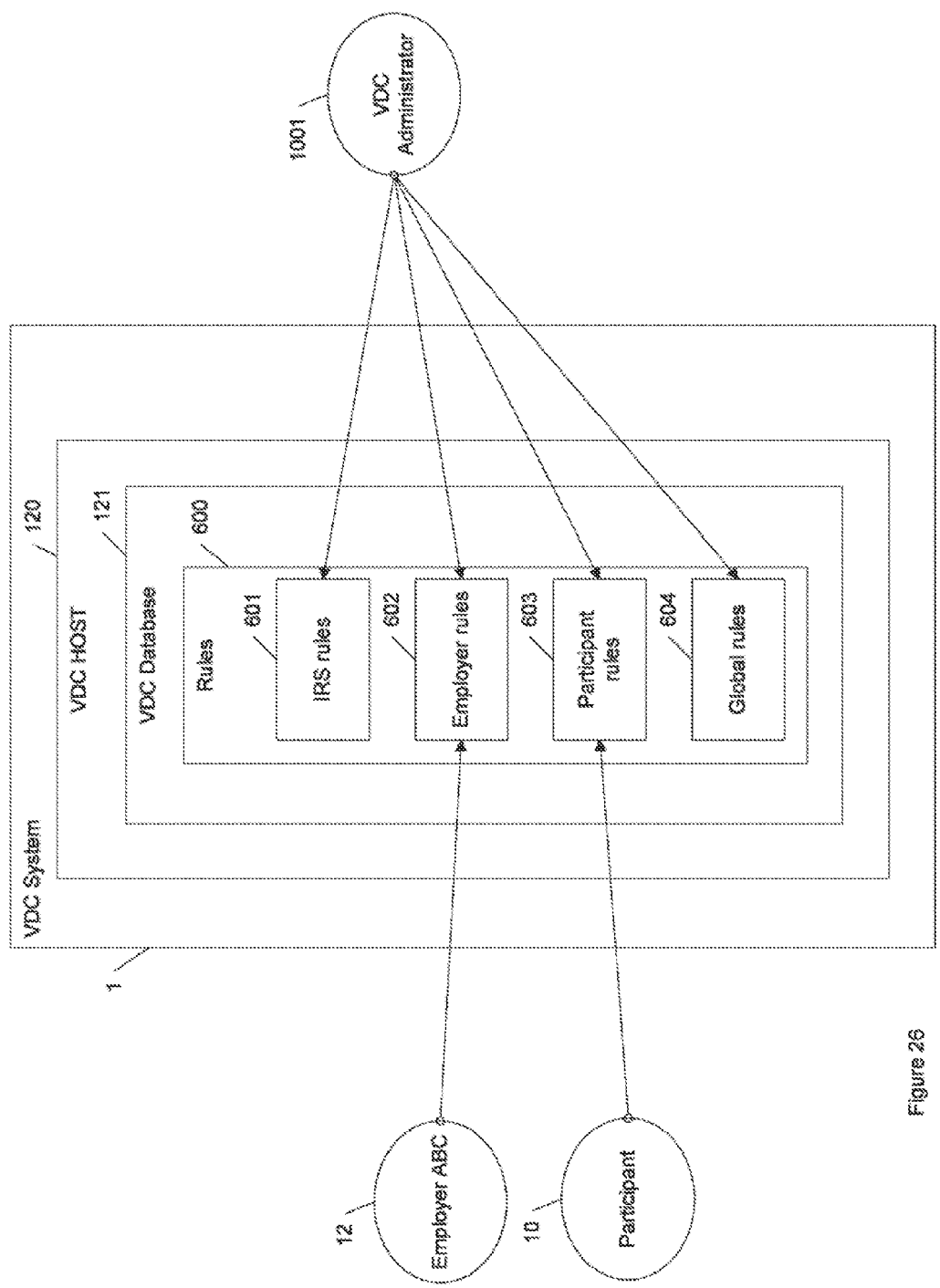
FIG. 26 is a schematic diagram showing how security functionally governs the maintenance of rules within the VDC HOST database.

FIG. 26 is a schematic diagram showing how security functionally governs the maintenance of rules 600 within the VDC HOST database 121. Only the VDC Administrator 1001 can maintain the global rules 604. An employer 12 can maintain only its' employer rules 602. A participant 10 can maintain only its' participant rules 603. The VDC Administrator 1001 can override and update any rule 600, including employer's rules 602, participant's rules 603, IRS rules 601, and global rules 604.

FIG. 27 is a schematic diagram showing the many ways in which the VDC system 1 can be deployed. Multiple VDC RTS 100, VDC Batch 200, and VDC Connector 20000 components can connect to the same VDC HOST 120 from remote locations. As volume and business needs dictate, the VDC system 1 can have more than one concurrent deployment. The various VDC 1 system components would be connected via standard means such as virtual-private network over a leased line.

Figure 28:
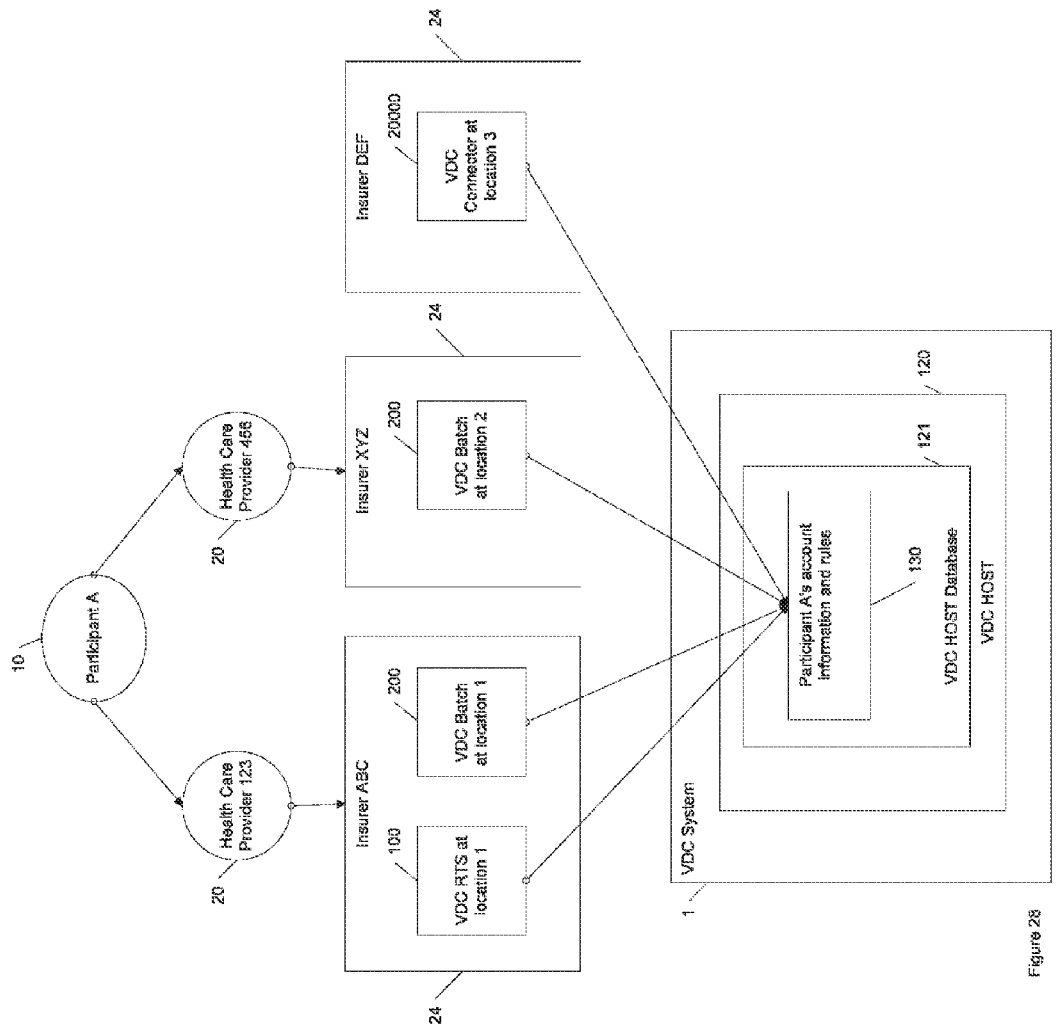
FIG. 28 is a schematic diagram showing how various VDC system components located at remote locations, such as with different insurer's, can interact with the same participant's account information and rules.

FIG. 28 is a schematic diagram showing how various VDC system 1 components located at remote locations, such as with different insurer's 24, can interact with the same participant's account information and rules 130. Since the VDS system 1 has a single centralized VDC HOST database 121, a VDC Connector 20000 component, a VDC Batch component 200, and a VDC RTS component 100 can simultaneously access the same participant's account information and rules 130 from remote locations. Furthermore, each insurer 24 (or other party 1000) can have one or more VDC RTS 100, VDC Batch 200, and/or VDC Connector 20000 components running concurrently at their location.

Figure 29:
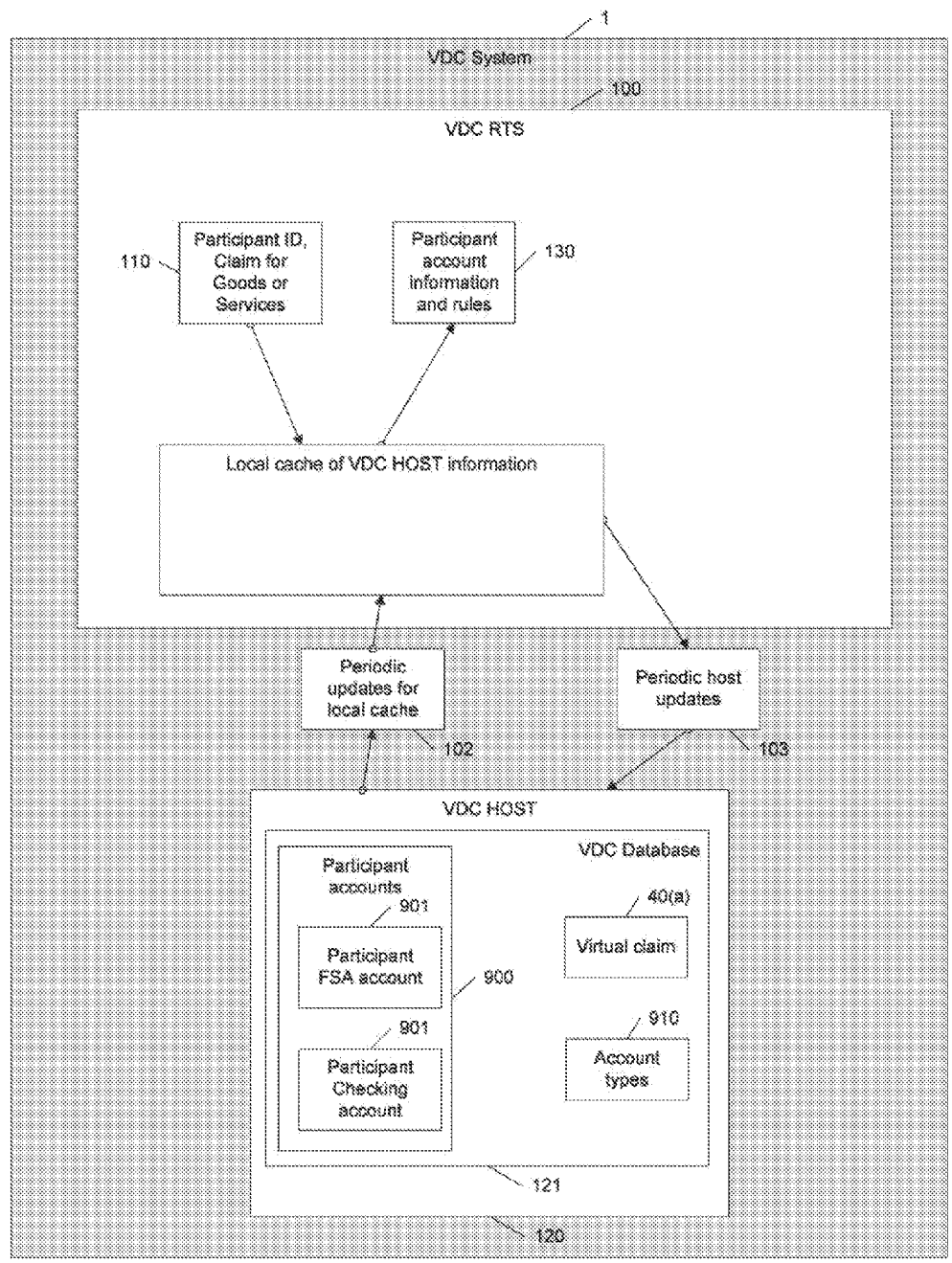
FIG. 29 is a schematic diagram showing how the VDC RTS can cache information from the VDC HOST for VDC system virtual claim adjudication processing.

FIG. 29 is a schematic diagram showing how the VDC RTS 100 can cache information from the VDC HOST 120 for VDC system 1 virtual claim adjudication processing. The VDC RTS 100 has the ability to store a local cache 101 of some or all of the information residing on the VDC HOST 120. VDC RTS 100 would process the virtual claims 40(*a*) as previously described using a local copy of the necessary information. Updates and logging based upon virtual claim adjudication results would be sent to the VDC HOST 120 as a periodic-feed update 103. A VDC HOST 120 update package 102 would be periodically sent to VDC RTS 100 to update the VDC RTS cache 101 by standard means such as FTP or messages sent over TCP/IP.

Figure 30:
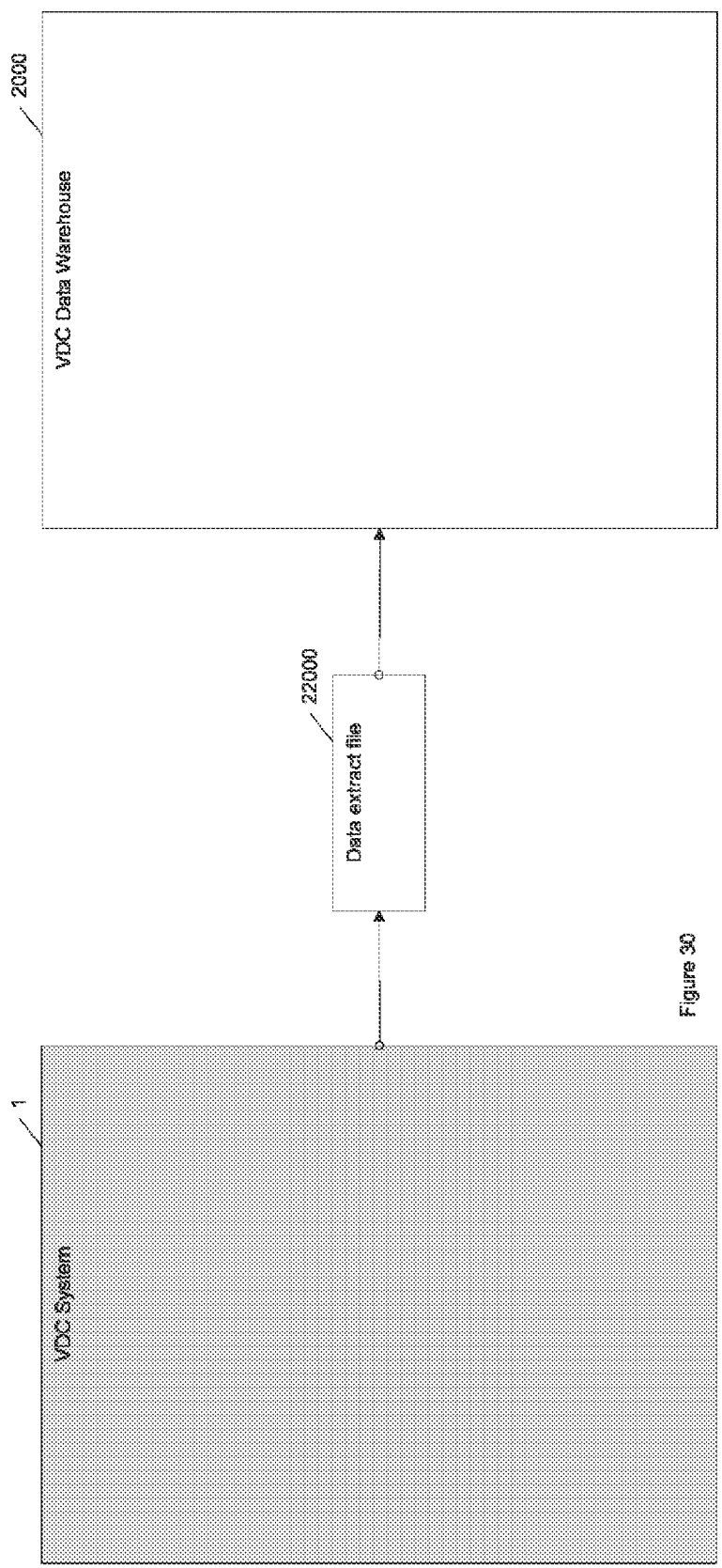
FIG. 30 is a schematic diagram showing how a VDC data warehouse can be used for reporting, billing, marketing, and other analysis purposes.

FIG. 30 is a schematic diagram showing how a VDC data warehouse 2000 can be used for reporting, billing, marketing, and other analysis purposes. A data extract file 22000 will be periodically created by the VDC system 1 by standard means and transferred by standard means such as FTP and loaded into the VDC data warehouse 2000. Data in the VDC data warehouse 2000 can be used in connection with standard summarization and reporting software packages.

Figure 31:
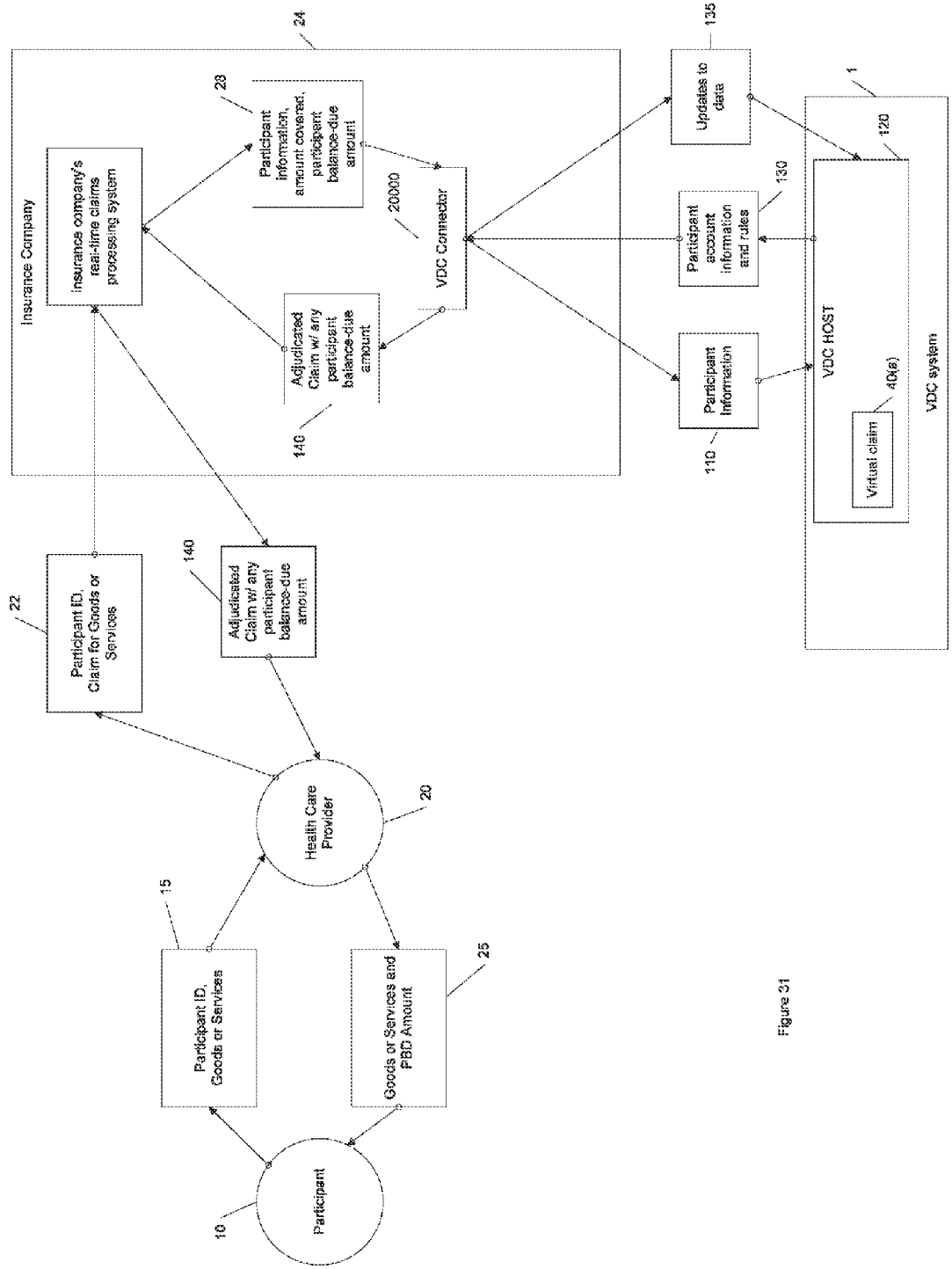
FIG. 31 is a schematic diagram showing how the VDC Connector component can be used in place of the VDC RTS component at the insurer's location.

FIG. 31 is a schematic diagram showing how the VDC Connector component 20000 can be used in place of the VDC RTS 100 component at the insurer's location. The VDC connector 20000 is an application programming interface (API) library, written in a language commonly known in the art, such as C, which provides VDC functionality directly to $3^{rd}$ party and other in-house applications. Any application that needs to leverage the services provided by the VDC system 1 can make the appropriate API calls and pass the relevant information to adjudicate virtual claims 40(*a*) for active participant's 10 within the VDC system 1. The VDC connector 20000 handles the virtual claim adjudication in the same way as described for the VDC RTS 100 component in FIG. 2 above.

Thus, it is seen that the objects of the present invention are efficiently obtained, although modifications and changes to the invention should be readily apparent to those having ordinary skill in the art, and these modifications are intended to be within the spirit and scope of the invention as claimed.

What is claimed is:

1. A computerized method for coordinating payment for healthcare expenses from at least one tax-advantaged account of a participant, comprising a general purpose computer specially programmed to perform the steps of:
receiving, using a processor for the specially programmed general purpose computer, information from a provider related to a request from said participant for a healthcare related good or service;
reviewing, using the processor, rules related to said at least one tax-advantaged account of said participant, said rules selected from a group consisting of employer plan rules and participant rules;
determining, using the processor, availability of funds from said at least one tax-advantaged account of said participant; and
deducting, using the processor, at least a portion of a co-payment from said at least one tax-advantaged account of said participant, wherein the participant rules are related to the use of funds, from the at least one tax-advantaged account of the participant, for payment of at least a portion of the healthcare related good or service, wherein the participant rules are modifiable by the participant and are selectable by the participant, wherein the employer plan rules include a designation of healthcare related goods or services allowed under the at least one tax-advantaged account of said participant, wherein the participant rules include a designation of healthcare related goods or services allowed under the at least one tax-advantaged account of said participant, and wherein the participant rules include a maximum payment amount from the at least one tax-advantaged account of said participant.

2. A computerized method for coordinating payment for healthcare expenses from at least one tax-advantaged account of a participant, comprising a general purpose computer specially programmed to perform the steps of:
receiving, using a processor for the specially programmed general purpose computer, information from a provider related to a request from said participant for a healthcare related good or service;
reviewing, using the processor, rules related to a plurality of accounts of the participant, the plurality of accounts usable for payment of at least a portion of the healthcare related good or service, and the plurality of accounts including said at least one tax-advantaged account of said participant;
prioritizing, using the processor, said plurality of accounts to determine an order, among the accounts in the plurality of accounts, by which funds for the payment of the at least a portion of the healthcare related good or service are to be withdrawn;
determining, using the processor, availability of funds from the plurality of accounts;
deducting, using the processor, at least a portion of a co-payment from the plurality of accounts according to the order of the plurality of accounts;
calculating, using the processor, a deficiency, said deficiency equal to the co-payment amount minus the sum of the available funds in the plurality of accounts; and,
notifying, using the processor, said provider of said deficiency.

3. The computerized method of claim 1 wherein said participant's account rules includes amount of said co-payment amount and a reimbursement amount based on insurance coverage of said participant.

4. The computerized method of claim 1 wherein said participant account rules are received, at least in part, from an insurer of said participant.

5. The computerized method of claim 1 wherein said participant account rules are preloaded on a computer.

6. The computerized method of claim 5 wherein said participant account rules are preloaded on a computer of a third party relative to said participant's insurer.

7. An apparatus for coordinating payment for healthcare expenses from at least one tax-advantaged account of a participant, comprising a specially programmed computer with a processor for:
receiving an electronic transmission including information from a provider related to a request from said participant for a healthcare related good or service;
reviewing rules related to said at least one tax-advantaged account of said participant, said rules selected from a group consisting of employer plan rules and participant rules, wherein the employer plan rules include a designation of healthcare related goods or services allowed under the at least one tax-advantaged account of said participant, wherein the participant rules include a designation of healthcare related goods or services allowed under the at least one tax-advantaged account of said participant, wherein the participant rules are modifiable by the participant, and wherein the participant rules include a maximum payment amount from the at least one tax-advantaged account of said participant;
determining availability of funds from said at least one tax-advantaged account of said participant; and,
deducting at least a portion of a co-payment from said at least one tax-advantaged account of said participant.

8. The apparatus of claim 7 wherein the specially programmed computer is preloaded with said participant's account rules.

9. The apparatus of claim 7 the specially programmed computer is programmed to receive electronic transmission of data from a second computer.

10. The apparatus of claim 9 wherein said second computer is controlled by said participant's insurer.

11. The apparatus of claim 7 wherein the processor is for determining availability of funds from said at least one tax-advantaged account of said participant using a computer program.

12. The apparatus of claim 7 wherein the processor is for deducting at least a portion of a co-payment from said at least one tax-advantaged account of said participant using a computer program.

13. A computerized method for coordinating payment for healthcare expenses from at least one account of a participant, comprising a general purpose computer specially programmed to perform the steps of:
receiving, using a processor for the specially programmed general purpose computer, information from a provider related to a request from said participant for a healthcare related good or service;
reviewing, using the processor, rules related to said at least one tax-advantaged account of said participant, the rules including participant rules modifiable by the participant, wherein the participant rules include a designation of healthcare related goods or services allowed under the at least one tax-advantaged account of said participant;

determining, using the processor, availability of funds from a plurality of accounts, said plurality of accounts including said at least one tax-advantaged account of said participant and at least one non tax-advantaged account of said participant; and deducting, using the processor, at least a portion of a co-payment from at least one account in said plurality of accounts.

14. An apparatus for coordinating payment for healthcare expenses from at least one account of a participant, comprising a specially programmed computer with a processor for:

receiving information from a provider related to a request from said participant for a healthcare related good or service;

reviewing rules related to said at least one tax-advantaged account of said participant, the rules including participant rules modifiable by the participant, wherein the participant rules include a designation of healthcare related goods or services allowed under the at least one tax-advantaged account of said participant;

determining availability of funds from a plurality of accounts, said plurality of accounts including said at least one tax-advantaged account of said participant and at least one non tax-advantaged account of said participant; and deducting at least a portion of a co-payment from at least one account in said plurality of accounts.

* * * * *